(12) United States Patent
Bolster et al.

(10) Patent No.: US 8,139,913 B2
(45) Date of Patent: Mar. 20, 2012

(54) MODULES INCLUDING MULTIPLE ROWS OF ADAPTERS FOR HIGH DENSITY OPTICAL FIBER DISTRIBUTION FRAME

(75) Inventors: Kristofer J. Bolster, Shakopee, MN (US); Heidi L. Miller, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 837 days.

(21) Appl. No.: 12/080,760

(22) Filed: Apr. 4, 2008

(65) Prior Publication Data

US 2010/0322577 A1   Dec. 23, 2010

Related U.S. Application Data

(63) Continuation of application No. 10/914,720, filed on Aug. 9, 2004, now Pat. No. 7,376,321.

(51) Int. Cl.
   *G02B 6/00* (2006.01)
(52) U.S. Cl. ........ 385/135; 385/134; 385/136; 385/137; 385/138; 385/139
(58) Field of Classification Search ........... 385/134–139
   See application file for complete search history.

(56) References Cited

U.S. PATENT DOCUMENTS

| | | |
|---|---|---|
| 4,630,886 A | 12/1986 | Lauriello et al. |
| 4,747,020 A | 5/1988 | Brickley et al. |
| 4,765,710 A | 8/1988 | Burneister et al. |
| 4,995,688 A | 2/1991 | Anton et al. |
| 5,129,030 A | 7/1992 | Petrunia |
| 5,179,618 A | 1/1993 | Anton |
| 5,289,558 A | 2/1994 | Teichler et al. |
| 5,317,663 A | 5/1994 | Beard et al. |
| 5,363,465 A | 11/1994 | Korkowski et al. |
| 5,402,515 A | 3/1995 | Vidacovich |
| RE34,955 E | 5/1995 | Anton et al. |
| 5,432,875 A | 7/1995 | Korkowski et al. |
| 5,497,444 A | 3/1996 | Wheeler |

(Continued)

FOREIGN PATENT DOCUMENTS

DE    42 29 510 A1    3/1994

(Continued)

OTHER PUBLICATIONS

ADC Telecommunications brochure entitled "Next Generation Frame (NGF) Product Family Ordering Guide," 21 pages, dated Oct. 1998.

(Continued)

*Primary Examiner* — Brian M. Healy
*Assistant Examiner* — Guy Anderson
(74) *Attorney, Agent, or Firm* — Merchant & Gould P.C.

(57) ABSTRACT

A fiber optic telecommunications frame is provided including termination modules positioned on left and right sides of the frame. The frame further includes left and right vertical cable guides. The frame includes a horizontal passage linking the left and right panels and the cable guides. The termination modules hold fiber optic modules with front termination locations. The fiber optic modules can house couplers, such as splitters, combiners, and wave length division multiplexers. A retention mechanism retains each fiber optic module in a partially removed position from the termination module. An adapter retainer may be removably mounted within an open front of the fiber optic modules, and a fiber optic module may include a plurality of rows of adapters.

7 Claims, 20 Drawing Sheets

U.S. PATENT DOCUMENTS

| | | | |
|---|---|---|---|
| 5,689,604 A | 11/1997 | Janus et al. | |
| 5,717,810 A | 2/1998 | Wheeler | |
| 5,734,776 A | 3/1998 | Puetz | |
| 5,758,002 A | 5/1998 | Walters | |
| 5,758,003 A | 5/1998 | Wheeler et al. | |
| 5,774,245 A | 6/1998 | Baker | |
| 5,903,698 A | 5/1999 | Poremba et al. | |
| 5,966,492 A | 10/1999 | Bechamps et al. | |
| 6,044,193 A | 3/2000 | Szentesi et al. | |
| 6,385,381 B1 * | 5/2002 | Janus et al. | 385/135 |
| 6,424,781 B1 * | 7/2002 | Puetz et al. | 385/135 |
| 6,526,210 B1 * | 2/2003 | Harrison et al. | 385/134 |
| 6,535,682 B1 | 3/2003 | Puetz et al. | |
| 6,556,763 B1 * | 4/2003 | Puetz et al. | 385/135 |
| 6,591,051 B2 | 7/2003 | Solheid et al. | |
| 6,631,237 B2 | 10/2003 | Knudsen et al. | |
| 6,760,531 B1 * | 7/2004 | Solheid et al. | 385/135 |
| 6,793,517 B2 | 9/2004 | Neer et al. | |
| 6,850,685 B2 | 2/2005 | Tinucci et al. | |
| 6,888,069 B1 | 5/2005 | Chen et al. | |
| 6,912,349 B2 * | 6/2005 | Clark et al. | 385/134 |
| 6,920,274 B2 * | 7/2005 | Rapp et al. | 385/135 |
| 6,937,800 B2 | 8/2005 | Côte | |
| 7,066,762 B2 | 6/2006 | Neer et al. | |
| 7,139,461 B2 * | 11/2006 | Puetz et al. | 385/135 |
| 7,142,765 B2 * | 11/2006 | Rapp et al. | 385/137 |
| 7,149,398 B2 * | 12/2006 | Solheid et al. | 385/135 |
| 7,218,827 B2 * | 5/2007 | Vongseng et al. | 385/135 |
| 7,233,731 B2 * | 6/2007 | Solheid et al. | 385/135 |
| 7,376,321 B2 * | 5/2008 | Bolster et al. | 385/135 |
| 2005/0003697 A1 | 1/2005 | Neer et al. | |
| 2006/0210229 A1 | 9/2006 | Scadden | |

FOREIGN PATENT DOCUMENTS

| | | |
|---|---|---|
| EP | 0 697 610 A1 | 2/1996 |
| EP | 0 871 047 A1 | 10/1998 |
| WO | WO 00/05611 | 2/2000 |
| WO | WO 00/52504 | 9/2000 |

OTHER PUBLICATIONS

ADC Telecommunications brochure entitled "FL2000 Products," 48 pages, dated Nov. 1996.

ADC Telecommunications brochure entitled "Fiber Cable Management Products, Second Edition," 144 pages, dated Oct. 1995.

"ADC OMX 600 Optical Distribution Frame Solution," *ADC Telecommunications, Inc.*, Publication No. 856, 8 pgs. (Feb. 2000).

"OMX™ 600 Optical Distribution Frame," *ADC Telecommunications, Inc.*, Publication No. 854, front cover, table of contents, pp. 1-13, rear cover (Apr. 2000).

ADC Telecommunications, Inc., 600 mm Products copied brochure, Value-Added Module System, Oct. 2003, pp. 53-78.

ADC Telecommunications, Inc., copied product brochure, Fiber Management Tray, Mar. 2003, pp. 1-8.

ADC Telecommunications, Inc., Mini VAM Connector Cleaning Instructions, ADCP-90-412, Issue 3, Sep. 2002, pp. 1-8.

ADC Telecommunications, Inc., Next Generation Frame (NGF) Product Tour, Value Added Modules (VAMs), Copyright 2003, (admitted as offered for sale as of Apr. 25, 2006, 1 page.

ADC Telecommunications, Inc., Mini VAM Splitter Mod (Installation Drawing), Drawing No. 1128185, technical drawing of the VAM pictured in Exhibit D, Mar. 14, 2001, 2 pages.

ADC Telecommunications, Inc., FMT Micro Value Added Monitor Module Configuration Scheme, Feb. 6, 2003, pp. 1-2.

* cited by examiner

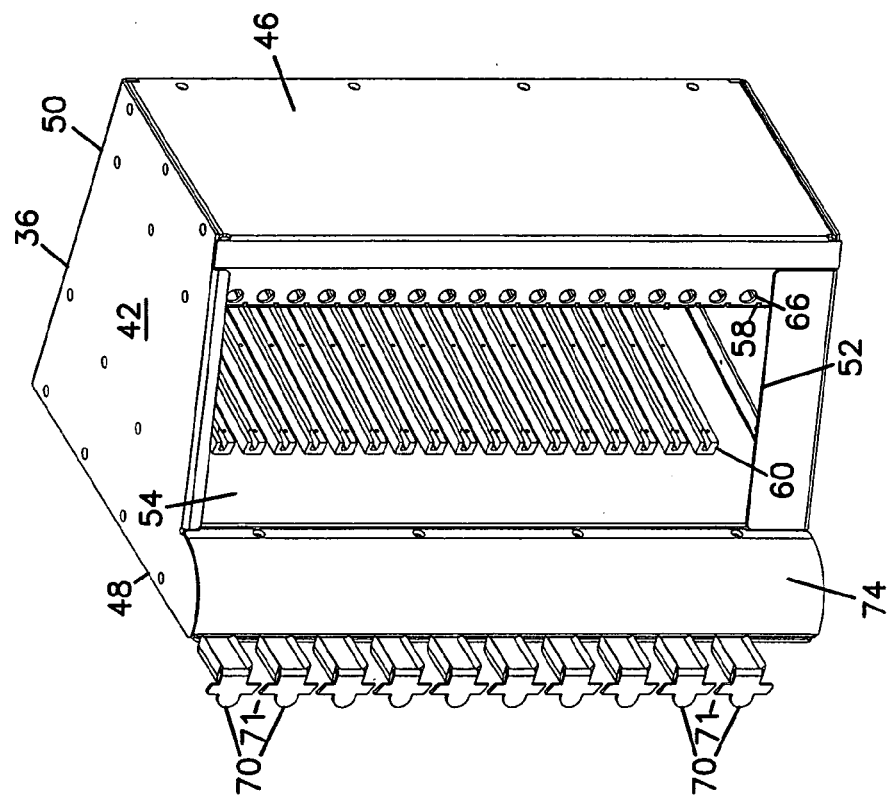
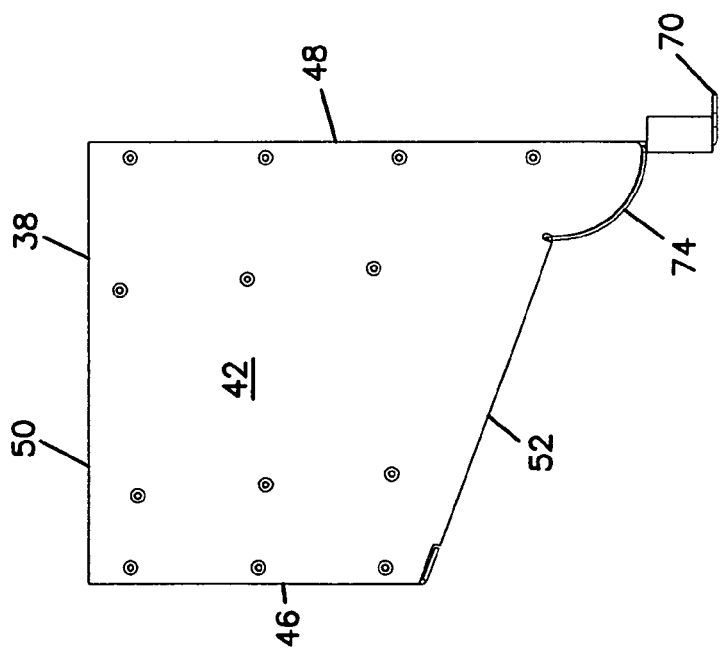

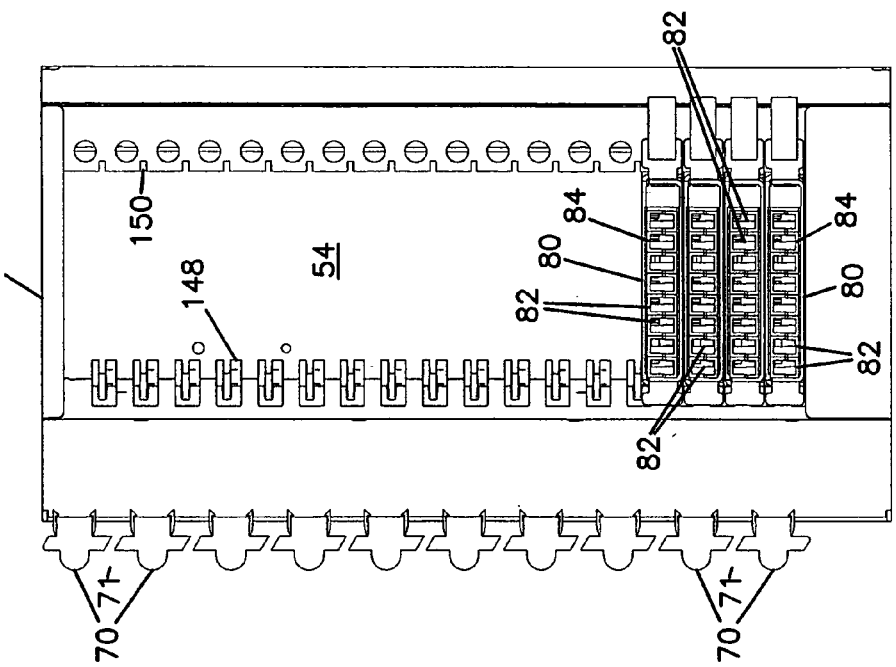
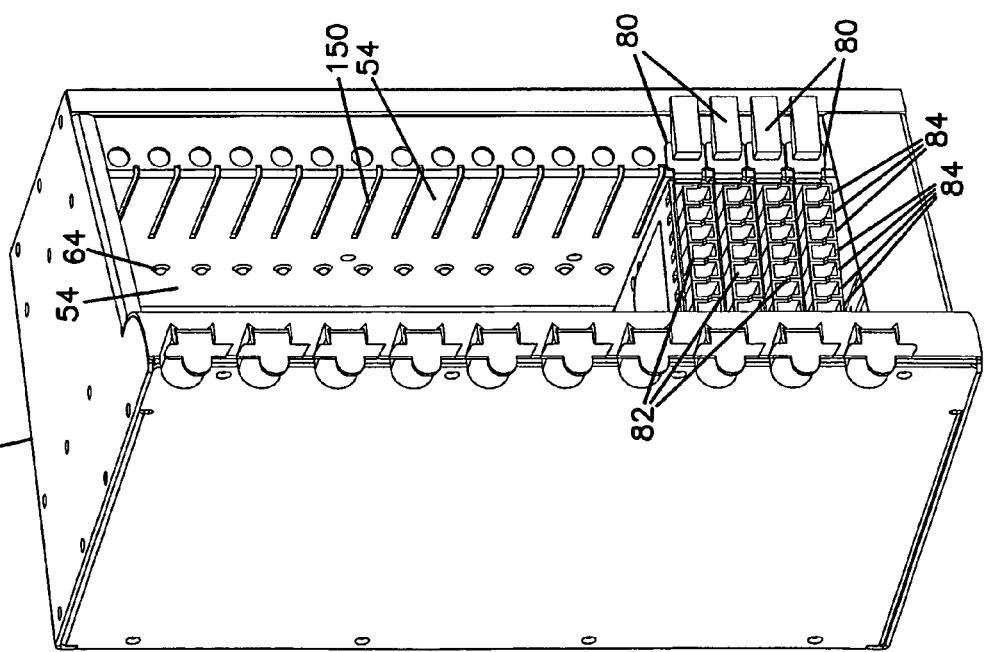

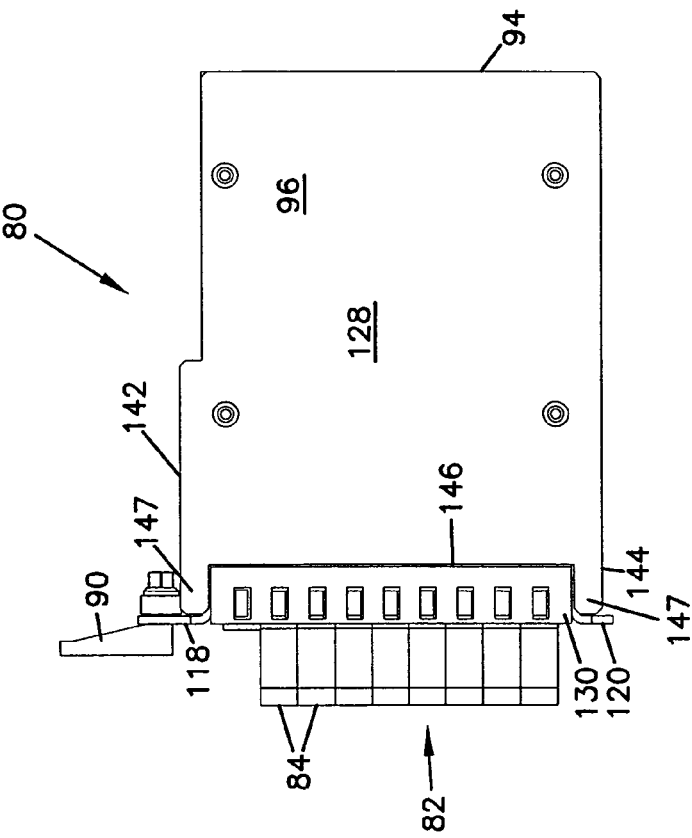
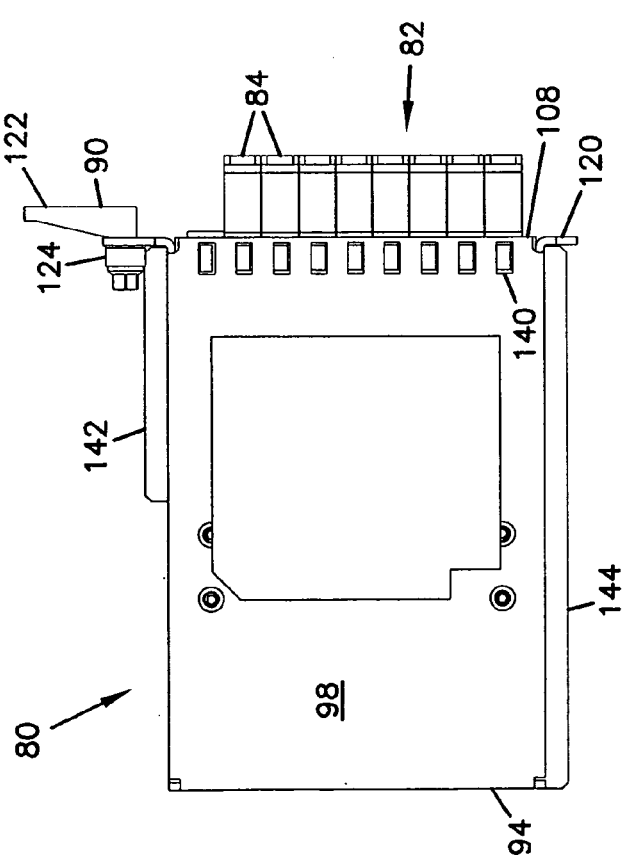

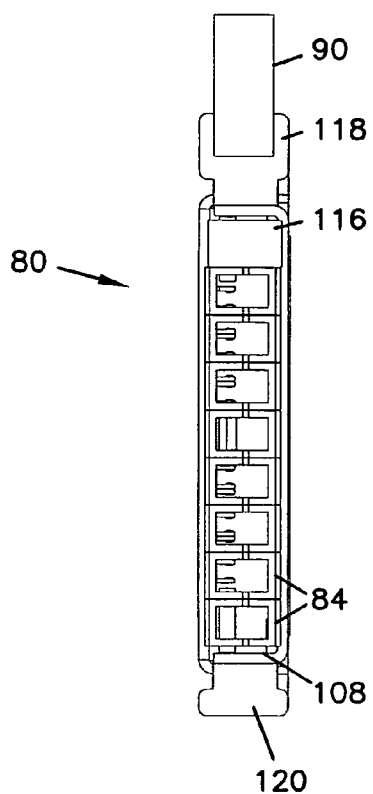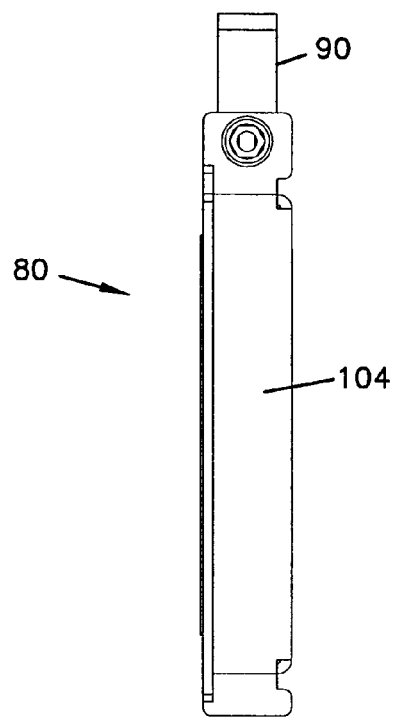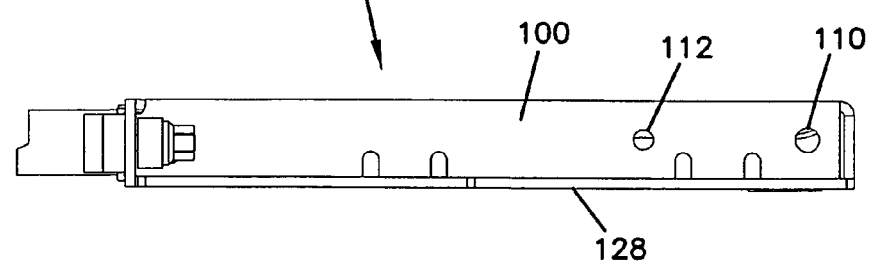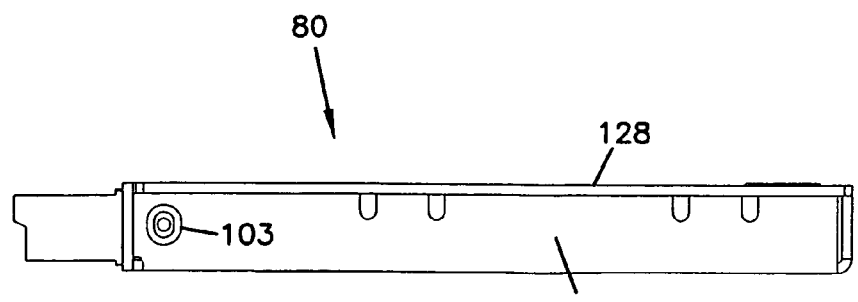

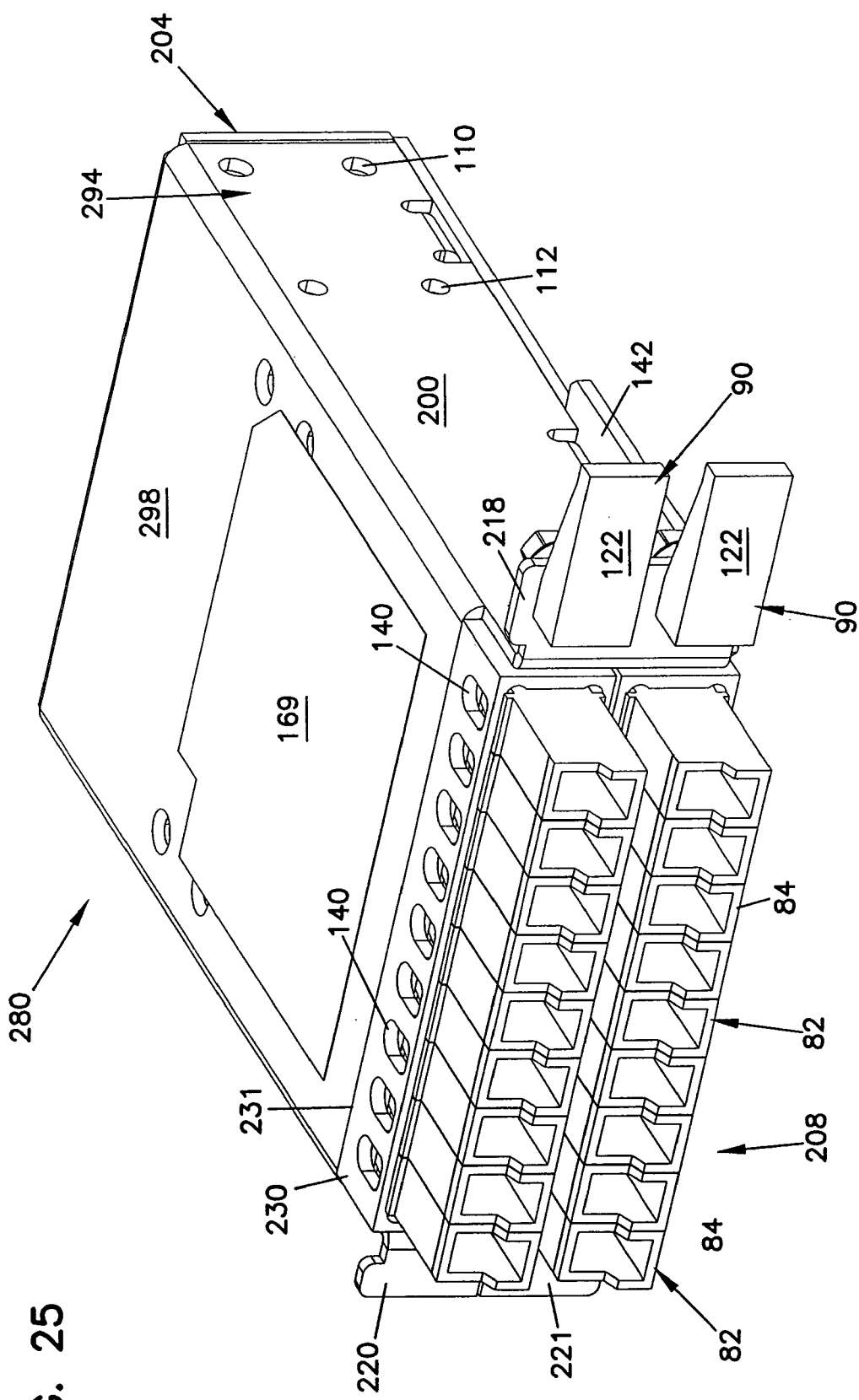

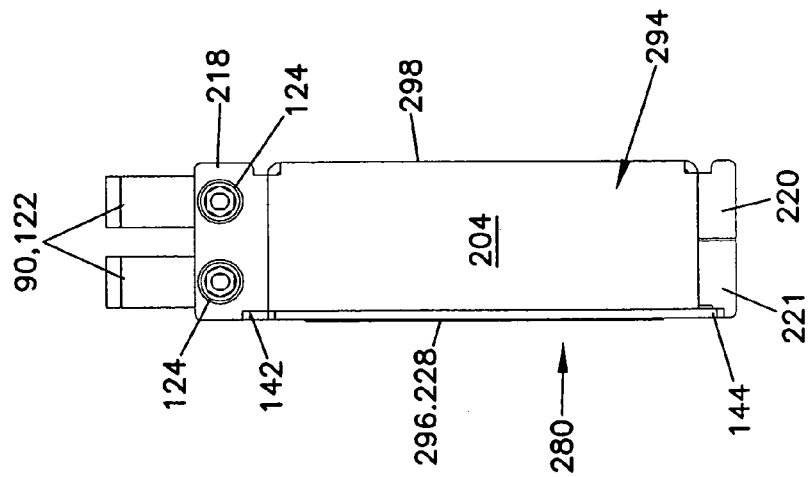
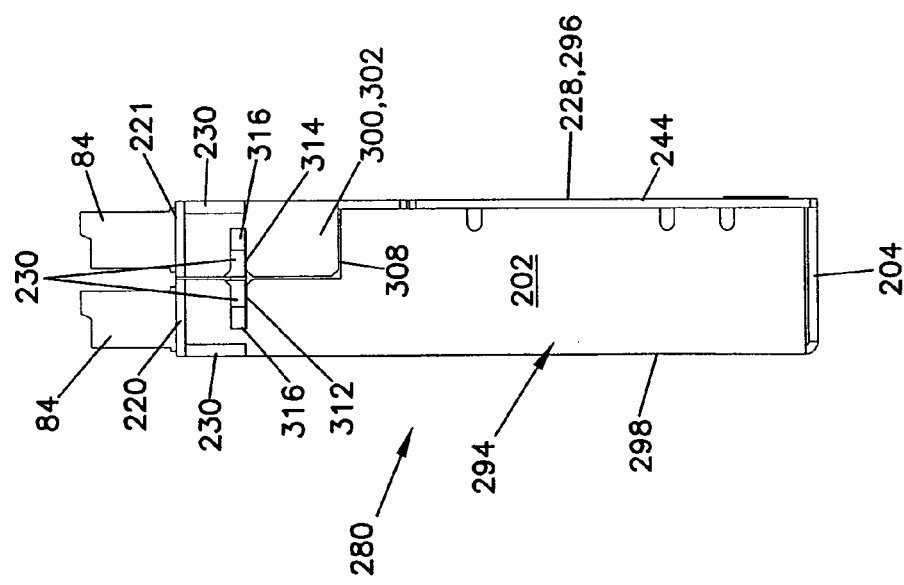

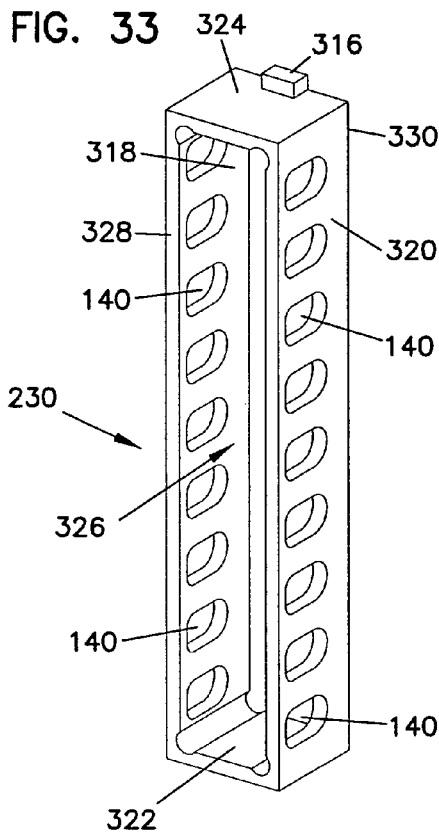
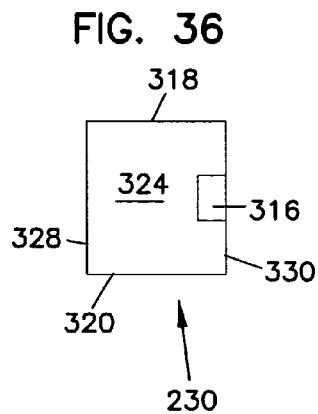
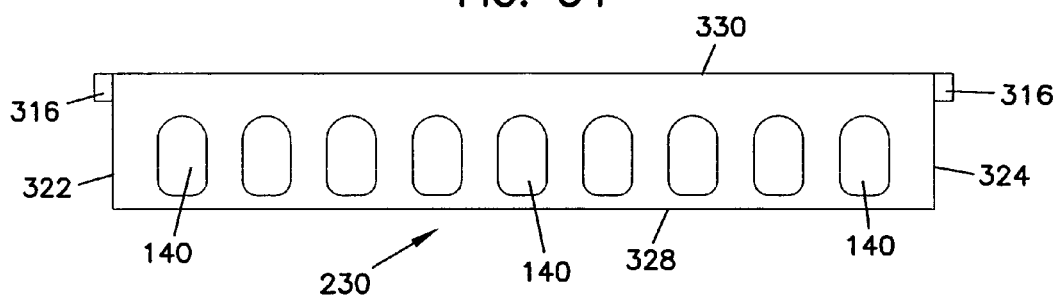
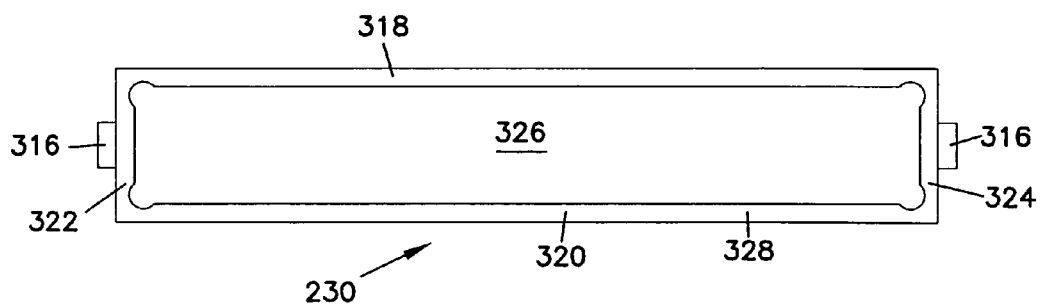

MODULES INCLUDING MULTIPLE ROWS OF ADAPTERS FOR HIGH DENSITY OPTICAL FIBER DISTRIBUTION FRAME

This application is a continuation of application Ser. No. 10/914,720, filed Aug. 9, 2004, now U.S. Pat. No. 7,376,321, which application is incorporated herein by reference.

FIELD OF THE INVENTION

This invention pertains to the telecommunications industry. More particularly, this invention pertains to modules for use with a high-density fiber distribution frame for use in the telecommunications industry.

DESCRIPTION OF THE PRIOR ART

In the telecommunications industry, use of fiber optic cables for carrying transmission signals is rapidly growing. To connect fiber optic equipment, fiber distribution frames have been developed. Examples of prior art fiber distribution frames are shown in commonly assigned U.S. Pat. Nos. 4,995,688; 5,497,444; and 5,758,003 to ADC Telecommunications, Inc. In each of the fiber distribution frames of the prior patents, a plurality of adapters are provided which permit attachment of fiber optic connectors to both sides of each adapter in order to optically couple two fiber optic cables. Cables from the adapters are connected to various pieces of fiber optic equipment. Using patch cords or cables between the adapters, the pieces of optical equipment are then cross-connected through the frame. The frame defines a demarcation point between the equipment.

The use of modular fiber optic connector modules is known for performing so-called cross-connect applications. U.S. Pat. Nos. 5,432,875; 5,363,465; and 6,208,796 to ADC Telecommunications, Inc. concern fiber optic connector modules and chassis designs for receiving the modules in cross-connect applications.

U.S. Pat. No. 6,556,763 also to ADC Telecommunications, Inc., concerns a fiber distribution frame with connector modules. The connector modules of the '763 patent slide into termination modules held by the frame.

Notwithstanding advances previously made in the art, there is a continuous need for further advances to maintain a high-density of connector terminals. There are further needs for ready access to the fiber optic connectors and couplers, enhanced fiber management, and avoidance of excessive bending and stresses on the fiber optic cables.

SUMMARY OF THE INVENTION

The present invention relates to a fiber optic module adapted to be held by a frame. The fiber optic module includes a housing with two spaced-apart major sides extending parallel to one another, the major sides interconnected by two spaced-apart minor sides, extending parallel to one another. The major and minor sides extend between front and rear ends of the housing. The front end of the housing is open and defined by edges of the two major and minor sides. At least one adapter retainer is removably mounted in the open front end of the housing. Each adapter retainer includes two spaced apart major walls and two spaced apart minor walls extending between the major walls. The major walls extend generally parallel to the edges of the major sides, and each of the major walls includes a plurality of apertures. A bracket is removably mounted to the housing adjacent the adapter retainer and securing the adapter retainer to the housing. A plurality of fiber optic adapters are mounted to the retainer. Each adapter includes two projections, and each projection is received in one of the apertures in the major walls of the adapter retainers. Fiber optic circuitry within the housing connects the fiber optic adapters.

The present invention further relates to a fiber optic module adapted to be held by a frame. The fiber optic module includes a housing including two spaced-apart major sides extending parallel to one another, the major sides interconnected by two spaced-apart minor sides, extending parallel to one another. The major and minor sides extend between front and rear ends of the housing. The front end of the housing is open and defined by the two major and minor sides. At least one adapter retainer is mounted within the front end extending between the minor sides. The adapter retainer has first and second major sides extending generally parallel to the major sides of the housing. The major sides of the adapter retainer include a plurality of apertures. Front flanges are included on opposite ends of the front end, with one of the front flanges including a latch for latching the front end of the housing to the frame. Two side flanges extend in opposite directions from one of the major sides.

The present invention also relates to a method of using a fiber optic module including providing a housing including at least two fiber optic adapter retainers in a stack, each adapter retainer configured for holding a plurality of fiber optic adapters. A portion of the housing is removed to allow selective removal of at least one of the adapter retainers. The selected adapter retainer is removed from the remainder of the housing.

BRIEF DESCRIPTION OF THE DRAWINGS

FIG. 4 is a top view of the termination module of FIG. 2.

FIG. 5 is a front, top and right side perspective view of one of the left side termination modules from the frame of FIG. 1.

FIG. 7 is a front, top and left side perspective view of the termination module of FIG. 5 showing four fiber optic modules of a first embodiment mounted within the termination module.

FIG. 8 is a front view of the termination module and fiber optic modules of FIG. 7.

FIG. 11 is a first side view of one of the fiber optic modules shown in FIGS. 7 through 10.

FIG. 12 is an opposite side view of the fiber optic module of FIG. 11.

FIG. 13 is a front view of the fiber optic module of FIGS. 11 and 12.

FIG. 14 is a rear view of the fiber optic module of FIGS. 11 and 12.

FIG. 15 is a first end view of the fiber optic module of FIGS. 11 and 12.

FIG. 16 is an opposite end view of the fiber optic module of FIGS. 11 and 12.

FIG. 25 is a second perspective view of the fiber optic module of FIG. 24.

FIG. 29 is a first side view of the fiber optic module of FIG. 24.

FIG. 30 is a second side view of the fiber optic module of FIG. 24.

FIG. 31 is a rear view of the fiber optic module of FIG. 24.

FIG. 33 is a perspective view of the adapter retainer of FIG. 33.

FIG. 34 is a top view of the adapter retainer of FIG. 33.

FIG. 35 is a front view of the adapter retainer of FIG. 33.

FIG. 36 is a side view of the adapter retainer of FIG. 33.

DETAILED DESCRIPTION OF THE PREFERRED EMBODIMENTS

Figure 1:
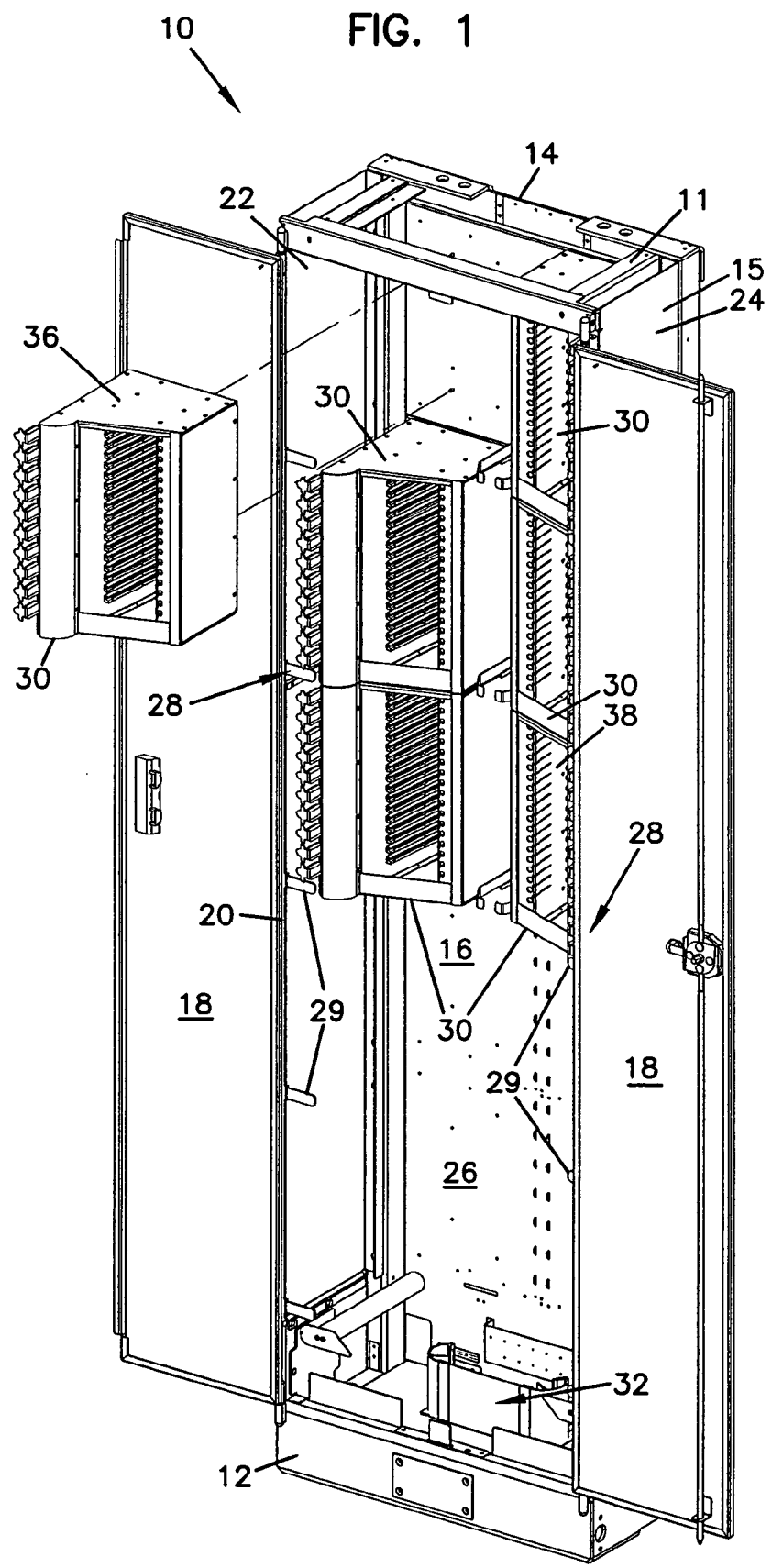
FIG. 1 is a front, top, and right side perspective view of a first embodiment of a fiber frame according to the present invention, with one left side chassis or termination module shown in exploded view, and with the front doors open.

In FIG. 1, a preferred embodiment of a bay or frame 10 is shown for terminating, and managing fiber optic cables within the frame. Frame 10 includes a rack 11 having a bottom 12, a top 14, and an enclosure 15 having an interior 16. Hinged doors 18 allow selective access to an open front 20 for accessing the interior 16.

Enclosure 15 of frame 10 further includes left and right sides 22, 24, and a rear 26. Left and right sides 22, 24 include cable management structure 28 in the form of fingers 29 for managing cables within frame 10. Also, received within the interior of frame 26 is a plurality of chassis or termination modules 30.

As shown in FIG. 1, only an upper portion of frame 10 is populated with termination modules 30. A lower portion of frame 10 can be populated with additional termination modules 30, or other cable management structures including cable splicing. Earlier U.S. Pat. No. 6,556,763 to ADC Telecommunications, Inc. shows various cable splicing structures, which can be utilized within frame 10. The disclosure of U.S. Pat. No. 6,556,763 is hereby incorporated by reference.

Frame 10 further includes horizontal cable management structure 32 adjacent to bottom 12 for managing cables passing between the left and right sides of frame 10. Such cabling may pass from cable management structure 28 positioned on each side of frame 10.

Frame 10 includes a plurality of termination modules 30. In preferred embodiments, termination modules 30 are provided with either a left hand arrangement 36 or a right hand arrangement 38 for use on left and right sides, respectively, of frame 10. The left and right hand arrangements 36, 38 assist with cable management and avoidance of excess bending on the cables. In the preferred embodiment, the cables are angled toward the left or rights sides 22, 24 of frame 10. The left and right hand arrangements 36, 38 are generally mirror images of each other.

Figure 3:
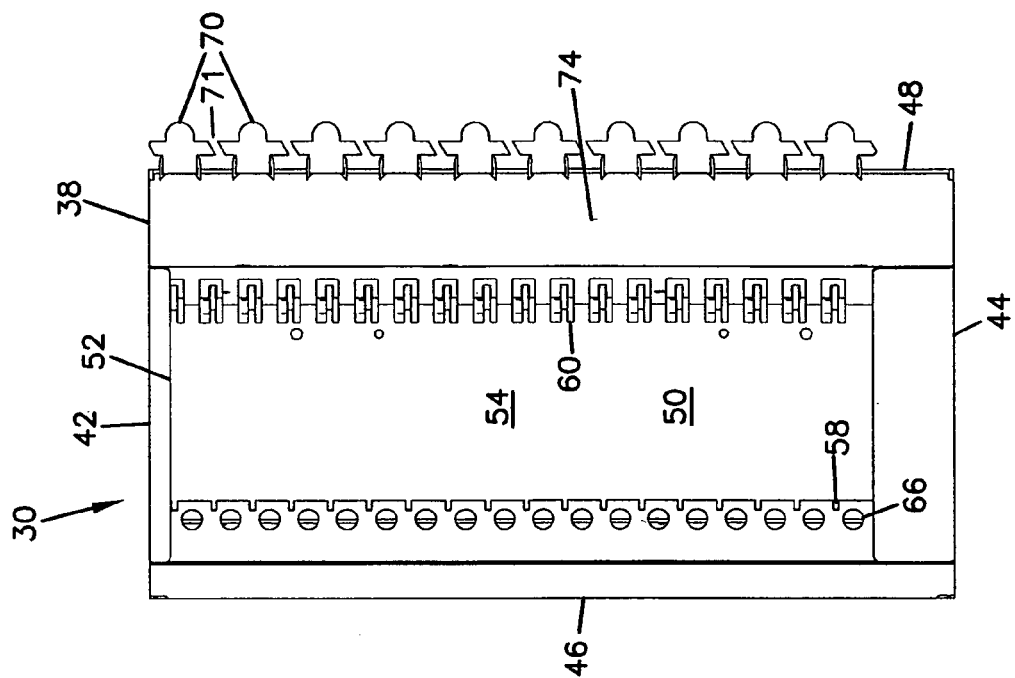
FIG. 3 is a front view of the termination module of FIG. 2.
Figure 2:
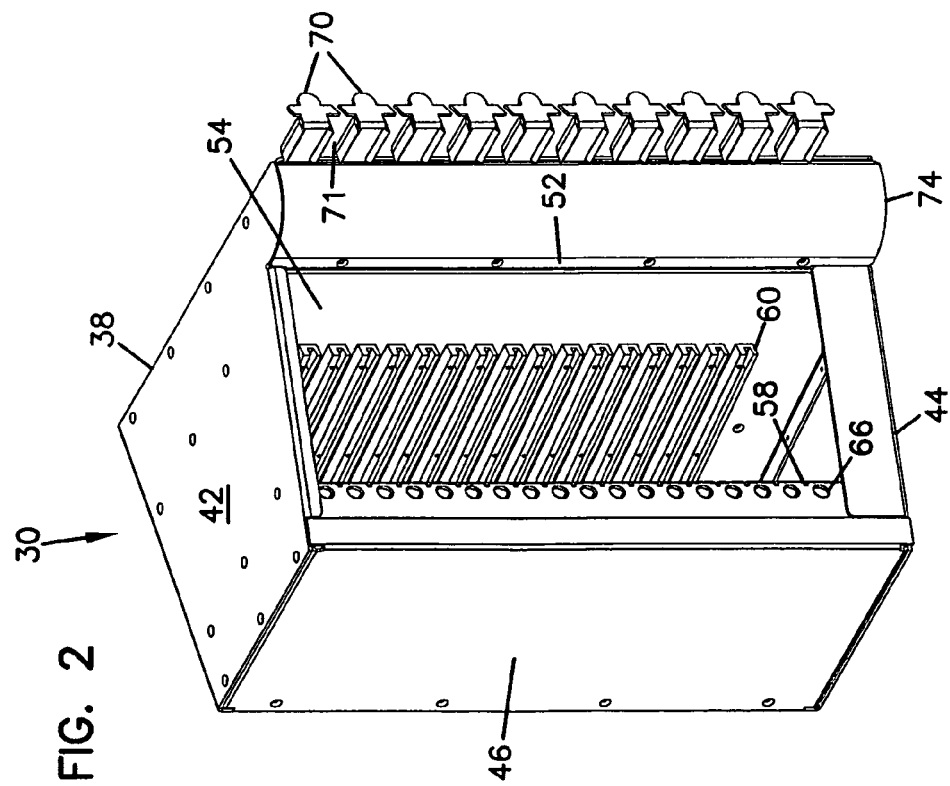
FIG. 2 is a front, top, and left side perspective view of one of the right side termination module from the frame of FIG. 1.
Figure 6:
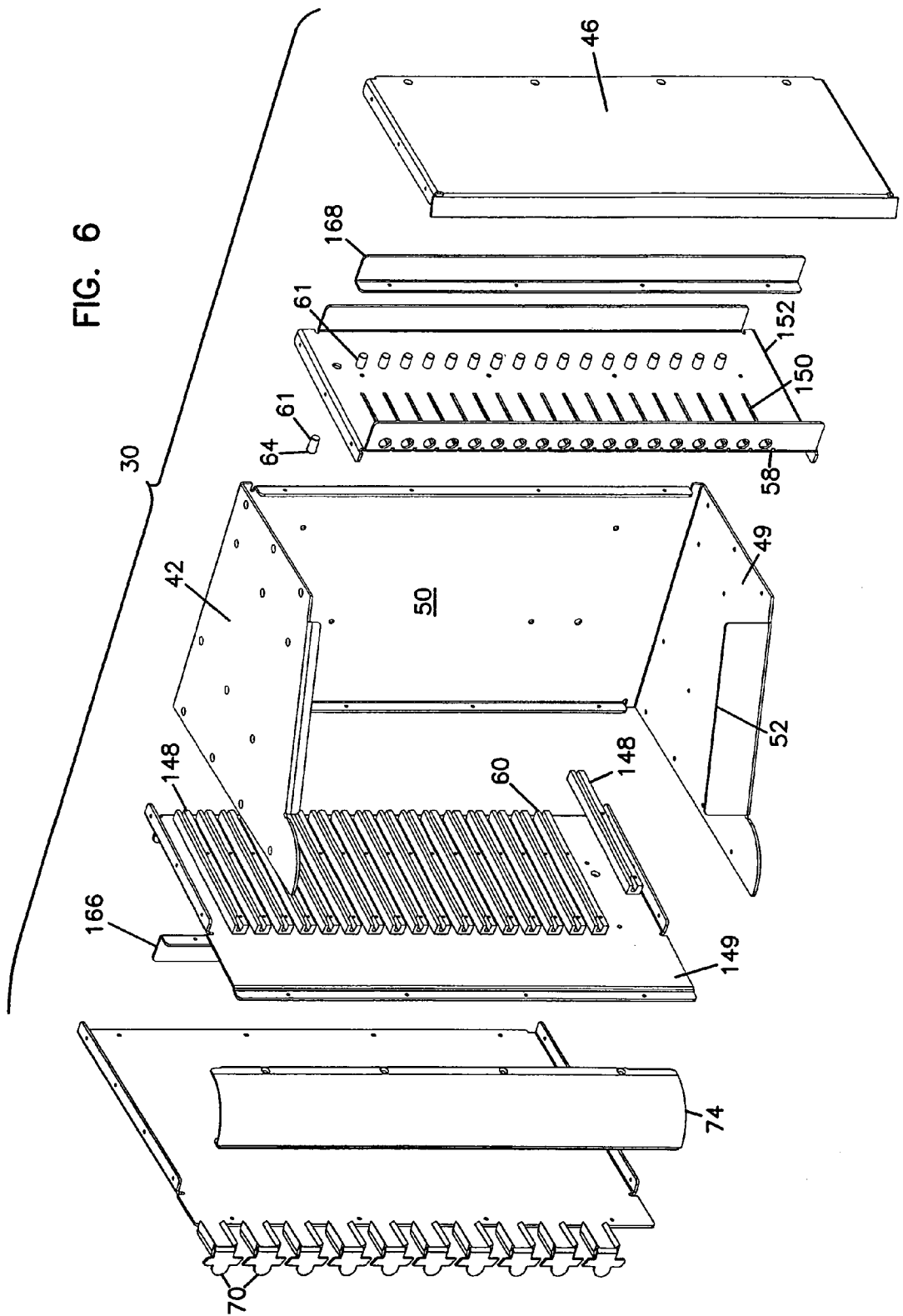
FIG. 6 is an exploded view of the termination module of FIG. 5.

Referring now to FIGS. 2 through 4, one of the right hand arrangements 38 for termination module 30 is shown. Termination module 30 includes first and second ends 42, 44, first and second sides 46, 48, and a rear 50. A front end 52 is generally open for receipt of fiber optic modules, as will be described below. Termination module 30 defines an interior 54 for receipt of the fiber optic modules. Interior 54 includes first and second longitudinal guides 58, 60 for slideably receiving the fiber optic modules in a linear direction. Termination module 30 further includes a module retention mechanism 61 for retaining the fiber optic modules with the termination module. In particular, the retention mechanism 61 holds the fiber optic modules with the termination module 30 when a selected fiber optic module 80 is partially removed from the termination module (see FIGS. 7-10). The retention mechanism of the illustrated embodiment includes a spring biased ball plunger 64 (see also FIG. 22). Interaction between the ball plunger 64 with the fiber optic modules will be discussed in greater detail below. Other retention mechanisms are possible for holding the fiber optic modules 80 in the partially removed position.

Termination module 30 further includes structure for retaining each fiber optic module with the termination module when the fiber optic module is fully inserted into interior 54. In the illustrated embodiment, termination module 30 includes apertures 66 for receipt of a fastener, lock or latching element for each fiber optic module, as will be discussed in greater detail below.

Termination module 30 includes cable management structure in the form of cable guides 70 defining passages 71 for receiving cables extending toward front end 52 of termination module 30. Termination module 30 further includes a curved panel 74 to further prevent cable damage by not allowing the cables extending toward front end 52 to be bent below the minimum bend radius which might cause cable damage and loss of performance. Fingers 29 of frame 10, sides 22, 24 and cable guides 70 define vertical channels for cables extending to and from termination modules 30. The cables can extend vertically upward out of frame 10, or downward into the floor of a raised floor system. Alternatively, the cables can pass horizontally from one side of frame 10 to the other, or to other adjacent frames.

Figure 9:
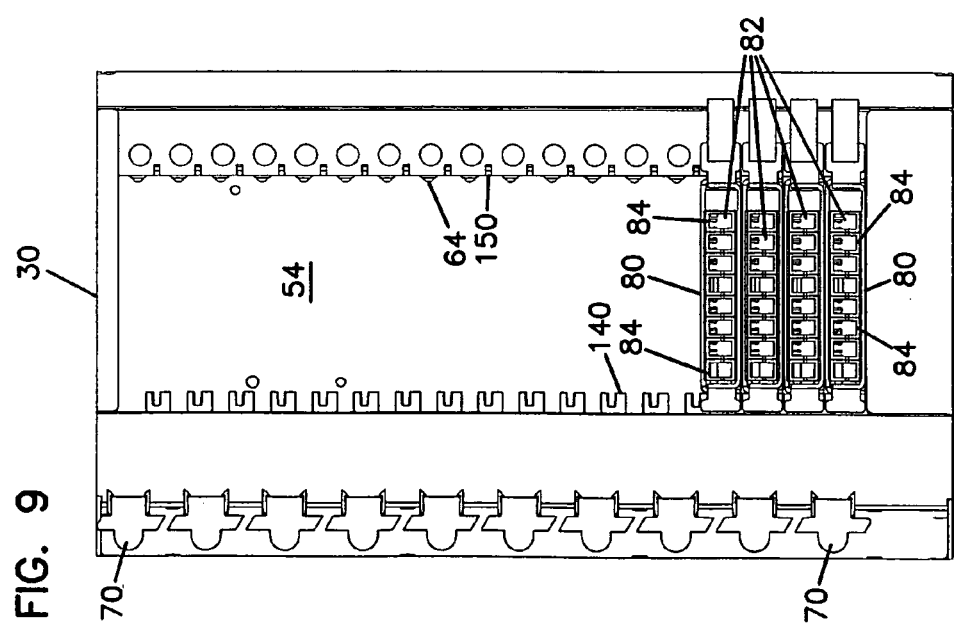
FIG. 9 is a front and left side view of the termination module of FIGS. 7 and 8, taken from a position looking into the termination module in the direction of sliding movement of each of the fiber optic modules.

Referring now to FIGS. 7 through 10, one of termination modules 30 is shown with a plurality of fiber optic modules 80 received within interior 54. Additional fiber optic modules 80 can populate the remaining open space of termination module 30. As shown in FIGS. 7 through 9, each fiber optic module 80 presents a plurality of connection locations 82 defined by fiber optic adapters 84. Adapters 84 can be any of a variety of fiber optic adapters desired for use in frame 10. In particular, fiber optic adapters such as SC, E2000, LC or LX.5 (by ADC Telecommunications, Inc., and shown in U.S. Pat. Nos. 5,883,995 and 6,142,676). Alternatively, other adapters can be utilized. Adapters 84 define the connection locations 82 for connecting to connectors on the ends of fiber optic cables. On an opposite end of adapters 84, disposed within fiber optic modules 80, adapters 84 also receive a fiber optic connector associated with the internal circuitry of fiber optic modules 80.

Figure 10:
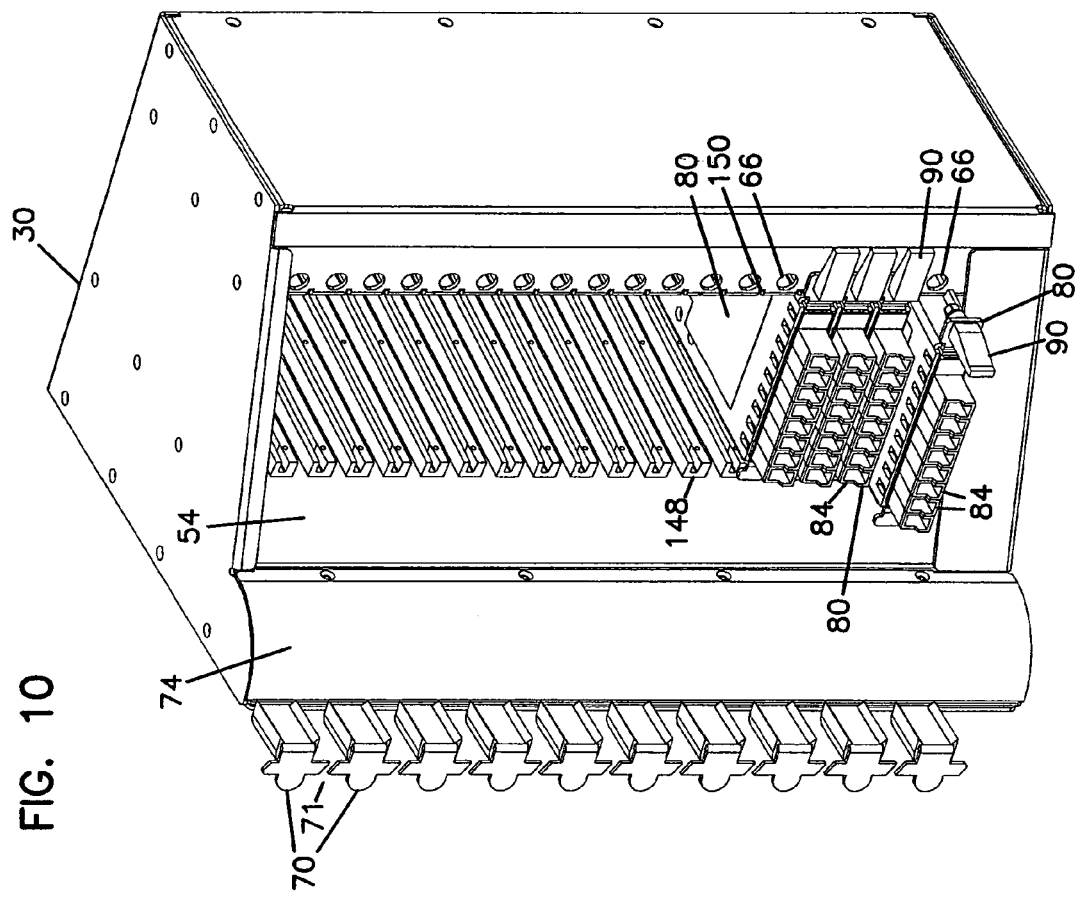
FIG. 10 is a front, top and right side perspective view of the termination module relative and fiber optic modules of FIG. 7, and showing one of the fiber optic modules partially removed from a remainder of the fiber optic modules.

Still referring to FIGS. 7 though 9, fiber optic modules 80 within termination module 30 present a dense arrangement of the connection locations 82. Should access to a selected connection location 82 be desired, such as for connecting or disconnecting a cable connector to one of adapters 84, an operator may have a difficult time accessing the selected connector and adapter without disrupting other connections. Referring now to FIG. 10, one of fiber optic modules 80 is shown partially removed from termination module 30 so as to improve the ease of access by the operator to the selected connection location 82. In FIG. 10, the lowermost fiber optic module 80 is shown partially removed to improve access to adapters 84 of the partially removed module.

Termination module 30 cooperates with each fiber optic module 80 to hold fiber optic modules 80 in the fully inserted position. Termination module 30 also cooperates with each fiber optic module 80 to allow for partial removal of selected fiber optic modules 80 as shown in FIG. 10. A latch 90 on each module 80 securely retains each fiber optic module 80 with termination module 30. Latch 90 as shown is a swell latch which cooperates with apertures 66 of termination module 30. When latch 90 is released, by flipping the latch, the selected fiber optic module 80 can be removed from termination module 30 if desired.

Fiber optic module 80 can also be retained in the position shown in FIG. 10 for the lowermost fiber optic module 80. As will be described below, fiber optic module 80 includes structure which cooperates with the ball plunger 64 of termination module 30 to hold the partially removed fiber optic module 80 to termination module 30.

Figure 19:
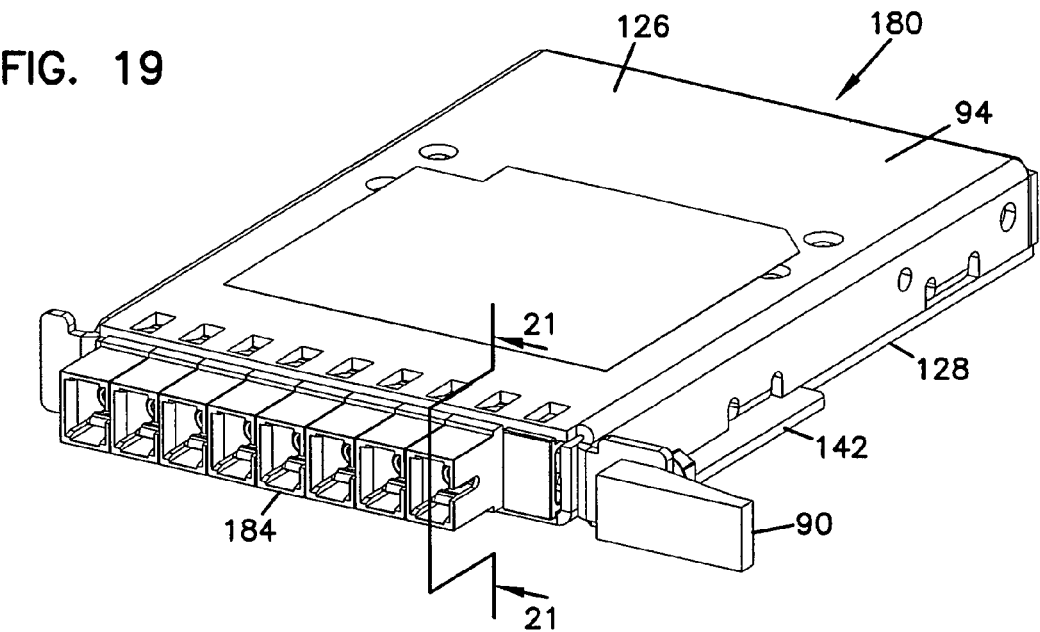
FIG. 19 is a perspective view of a second embodiment of a fiber optic module.
Figure 21:
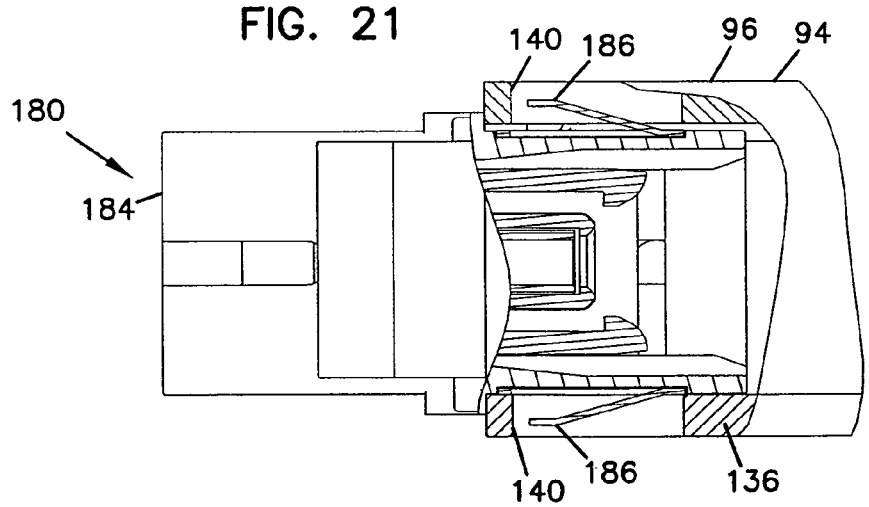
FIG. 21 is a partial cross-sectional view of a portion of the fiber optic module of FIGS. 19 and 20 showing the connection between one of the adapter, and the module housing taken along lines 21-21 of FIG. 19.
Figure 20:
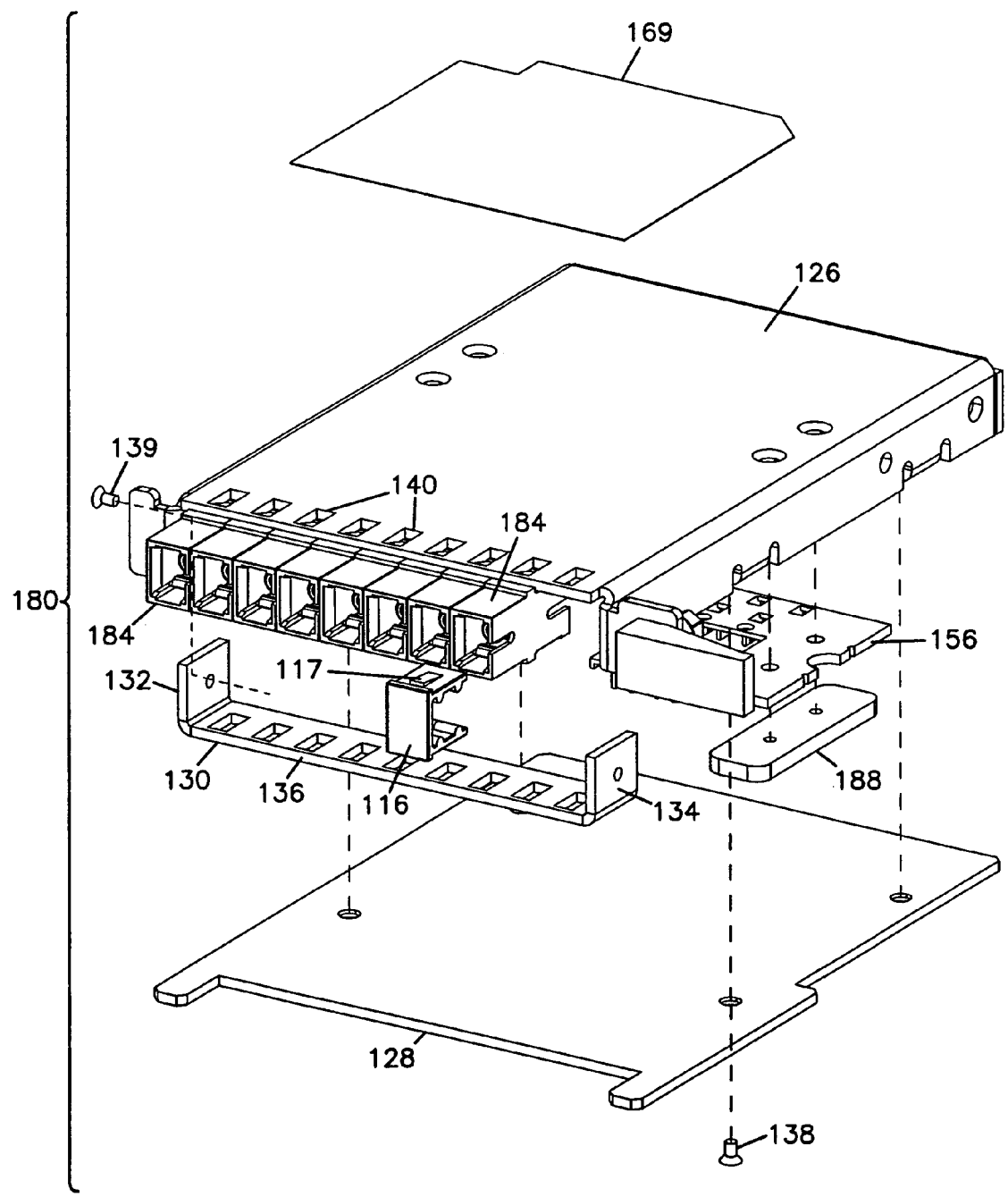
FIG. 20 is an exploded perspective view of the fiber optic module of FIG. 19.

Referring now to FIGS. 11 though 18, one of fiber optic modules 80 is shown in greater detail. Module 80 has a housing 94 including first and second major sides 96, 98, and first and second minor sides 100, 102. A rear end 104 cooperates with major sides 96, 98 and minor sides 100, 102 to define an interior 106 for housing fiber optic components and cables. FIGS. 19-21 show a second embodiment of a fiber optic module 180, with a similar housing construction. Module 180 includes the same housing 94, but uses different adapters 184.

Major sides 96, 98 and minor sides 100, 102 define an open front end 108, which receives fiber optic adapters 84. If desired, a blank 116 can be mounted at front end 108 instead of an adapter 84. As shown, module 80 has room for nine adapters or blanks.

Preferably, module 80 includes first and second front flanges 118, 120. As shown, front flange 118 holds latch 90. Latch 90 is a swell latch including a pivoting handle 122, and an expandable end 124 for receipt in opening 66 in termination module 30. Other latches, locks or fasteners can be used to retain module 80 in the fully inserted position.

In the preferred embodiment of fiber optic module 80, minor sides 100, 102, major side 98, and rear end 104 are integrally formed from a single housing structure or main portion 126, such as bent sheet metal. This single housing structure 126 can also include front flanges 118, 120. Further in the preferred embodiment, major side 96 includes a cover portion 128, and a front end portion 130. In the preferred embodiment, front end portion 130 includes a U-shape with ends 132, 134 and a central extension 136 positioned therebetween (see also FIG. 20).

Front end portion 130 and cover portion 128 are preferably also made from convenient structures, including sheet metal. Threaded fasteners 138 mount cover portion 128 to main portion 126 of fiber optic module 80. Threaded fasteners 139 further mount front end portion 130 to main portion 126. Fastener holes 103 in minor sides 100, 102 are preferably elongated to allow for a variety of spacings of front end portion 130 relative to main portion 126. Such a feature is desirable to accommodate adapters of differing dimensions for different modules. Main portion 126 includes a cutout 146 with projections 147 on opposite ends which receives end portion 130.

As noted above adapters 84 mount to front end 108 of fiber optic module 80. In the preferred embodiment, a line of apertures 140 is provided in each of major sides 96, 98 so as to receive attachment structure of each adapter 84. In the preferred embodiment, adapters 84 include projections 86 such as spring arms or latch portions or other structures, which are received in apertures 140. Similarly, blank 116 includes projections 117 for receipt in aperture 140 (see FIG. 20). By defining a front end 108 of fiber optic module 80 by the edges of major sides 96, 98, a thinner module can be provided. Thinner modules allow for greater densities of adapters 84 in a given footprint within frame 10 and termination module 30. With increased density may come the likelihood of more difficulty in accessing individual adapters 84. The present invention allows for partial removal of the fiber optic module 80 at the selected time.

The operator can individually access the selected module 80 without disrupting other cables and connections on adjacent modules. Preferably front end portion and major side 98 are made from thin sheet metal such as aluminum, at least 0.080 inches thick, so as to engage the spring arms of the adapter.

Module 80 includes flanges 142, 144 defined by cover portion 128. Flanges 142, 144 cooperate with first and second longitudinal guides 58, 60 of termination module 30 to slideably move into and out of termination module 30. In the preferred embodiment, flanges 142, 144 are planar structures extending beyond minor sides 100, 102 of fiber optic module 80. Longitudinal guides 58, 60 of termination module 30 are shown in one possible implementation including channel defining inserts 148 mounted on first interior panel 149 for first longitudinal guides 58, and slots 150 in second interior panel 152 defining second longitudinal guides 60. Both channel defining inserts 148 and slots 150 each receive one of flanges 142, 144.

Termination module 30 includes various panel elements 42, 44, 46, 48, 149, and 152 that can be made from any convenient housing material, such as sheet metal. Supports 166, 168 strengthen first and second interior panels 149, 152 in the preferred embodiment.

Termination module 30 preferably angles the adapters 84 toward cable guides 70. Such angling helps avoid excessive bends on the front cables extending toward fiber optic modules 80 positioned in termination module 30. Such angling is achieved by angling longitudinal guides 58, 60 toward cable guides 70. FIG. 8 shows a view into termination module 30 perpendicular to the planar rear 50. As can be seen in FIG. 8, inserts 148 and slots 150 are not perpendicularly positioned, but at a slight angle, such as 5 degrees, relative to rear 50. FIG.

9 shows a view of termination module 30 from the slight angle toward guides 70 showing the inserts 148 and slots viewed perpendicularly.

It is further preferred that fiber optic module 80 can be utilized either in the left hand arrangement 36 or the right hand arrangement 38 for termination modules 30 by merely flipping the module 180 degrees upside down from the left side to the right side of frame 10. Left and right hand arrangements 36, 38 are constructed so as to accommodate the flanges 142, 144 as modules 80 are flipped between the left and right sides.

Figure 17:
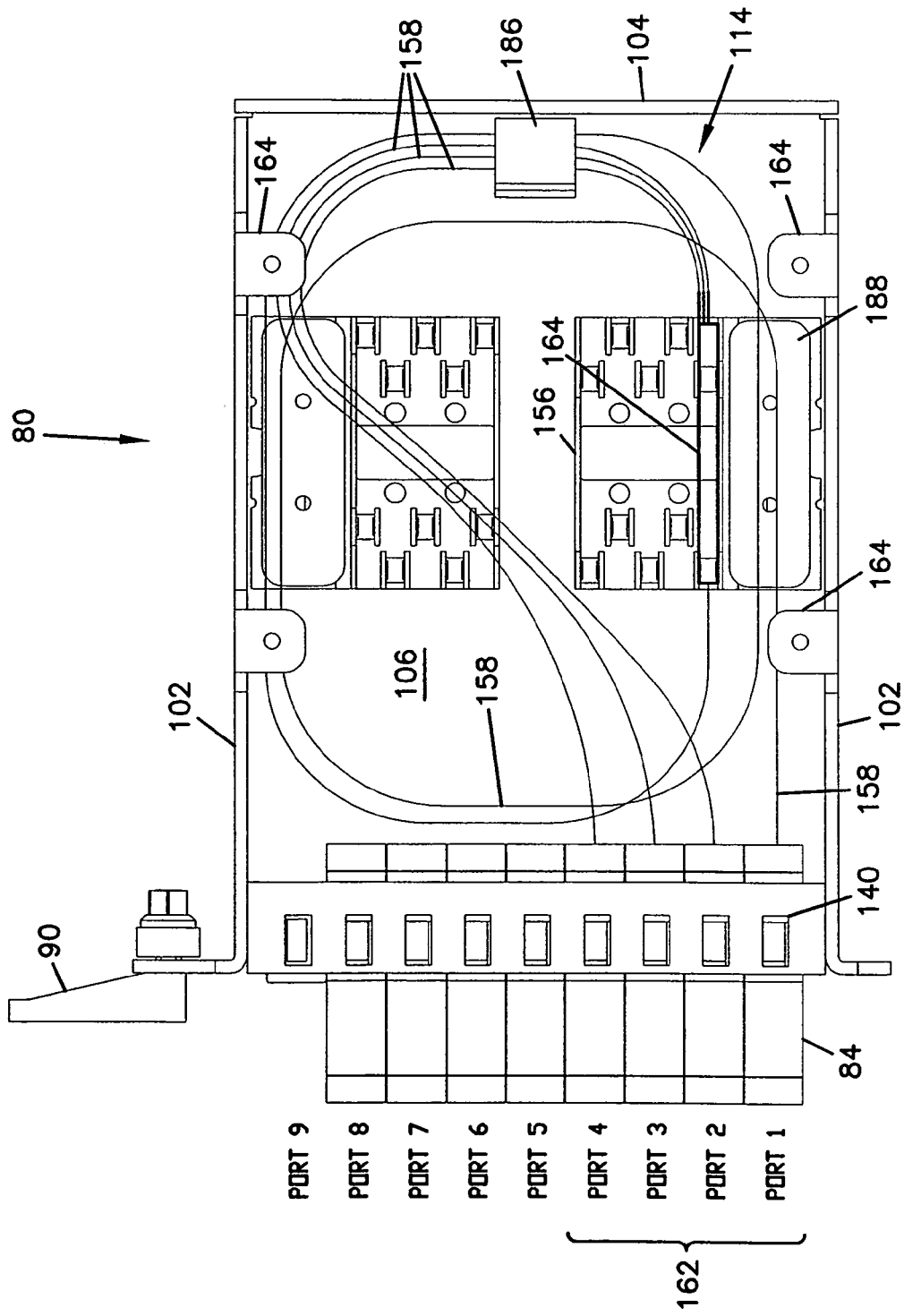
FIG. 17 is a view of the fiber optic module of FIG. 12 with the cover portion removed showing interior structures.
Figure 18:
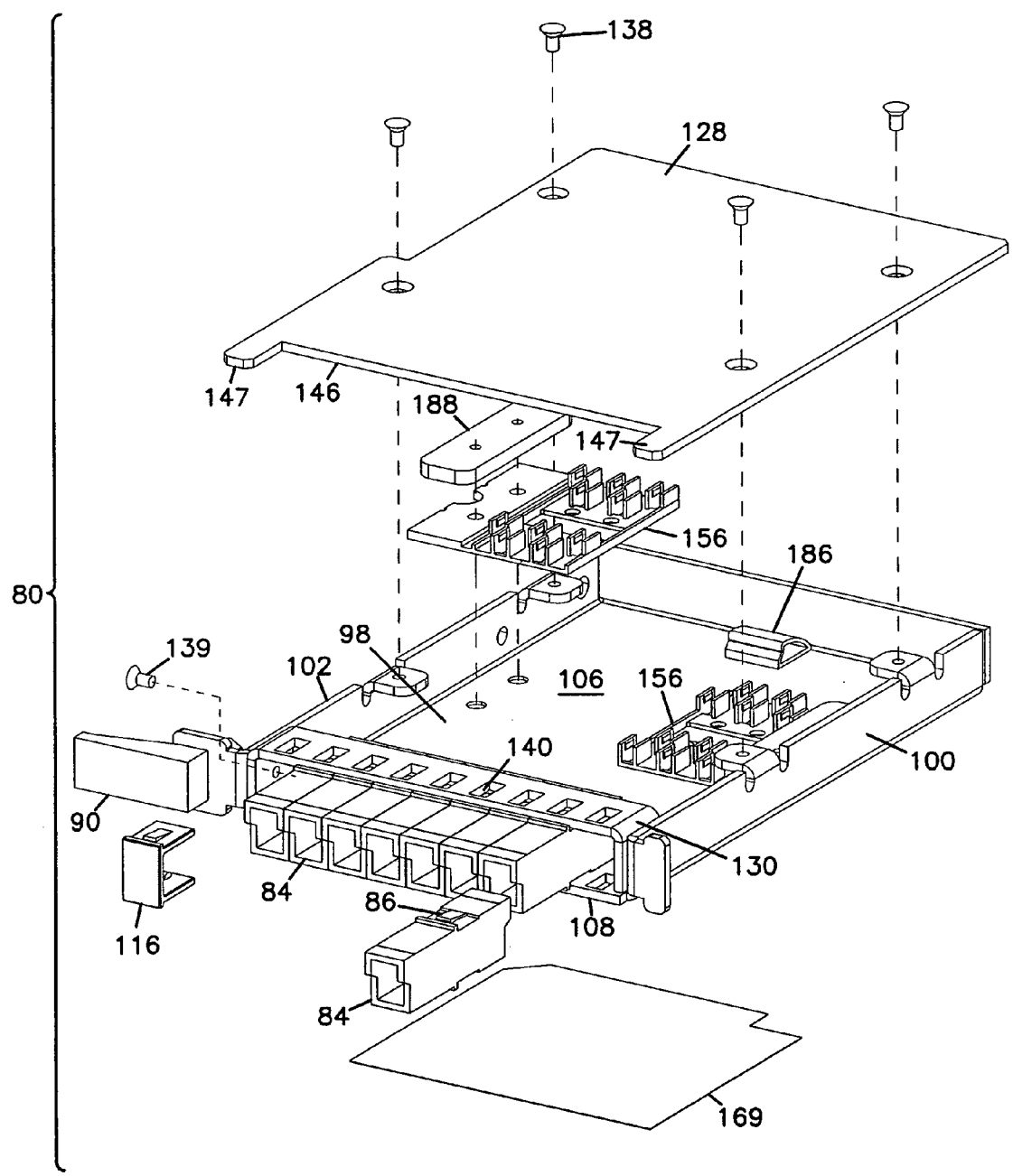
FIG. 18 is an exploded perspective view of the fiber optic module of FIGS. 11 through 17.

Referring now to FIGS. 17 and 18, the fiber optic circuitry 114 is illustrated within interior 106 of fiber optic module 80. Fiber optic couplers 164 are held by holders 156. A mounting plate 188 mounts each holder 156 to major side 98, such as with threaded fasteners (not shown). Internal cables 158 connect to rear ends of the adapters 84 through mating connectors (not shown). A variety of fiber optic circuitry can be utilized including fiber optic splitters, WDM's, DWDM's, and any other passive optical circuitry. In some embodiments, it may be desirable to have straight pass through connections, with monitoring ports. In that case, there would be one input, one output and one monitor port per circuit. Module 80 could hold three of those circuits. FIG. 17 shows a 1×3 optical splitter circuit 162. In FIG. 17, module 80 could house two 1×3 optical splitters, with one blank 116. Schematic label 169 can be added to module 80 to illustrate or describe the circuit functions for the operator.

Mounting tabs 164 for mounting main portion 126 to cover portion 128 are also used to retain cables 158 during assembly, before cover portion 128 is closed. Cable clip 186 assists with cable management.

Referring now to FIGS. 19 through 21, second embodiment of a fiber optic module 180 is shown. One difference over fiber optic module 80 is shown with respect to adapters 184. Adapters 184 are SC type, whereas adapters 84 are E2000 type. FIG. 21 shows in greater detail receipt of projections, e.g., spring arms 186, within apertures 140 of module housing 94. If adapters 184 were taller or shorter than adapters 84, the spacing between extension 136 and major side 96 can be adjusted with elongated holes 103 in minor sides 100, 102.

Figure 22:
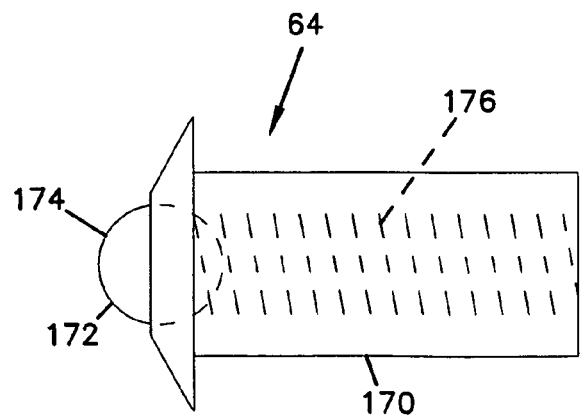
FIG. 22 is a side view of one of the ball plungers of the termination module of FIGS. 1 though 10.

Referring now to FIG. 22, an example ball plunger 64 is shown including a housing 170 which holds a ball 172 with a projecting end 174. An internal spring 176 biases ball 172 to the position shown. Ball plunger 64 is positioned within interior 54 of termination module 30 to retain each module 80 with termination module 30. Ball plungers 64 are press-fit into panel 152 of termination module 30. When fiber optic module 80 is partially removed from interior 54 of termination module 30, end 174 of ball 172 is received opening 110 in minor side 100 of module 80. With ball plunger 64 engaging opening 110, module 80 is retained by termination module 30 in the partially removed position. The engagement of ball plunger 64 with opening 110 provides a lock for retaining or holding module 80 while the operator accesses the desired connection location. In the case of the operator removing a connector from one adapter 84, ball plunger 64 holds module 80 in the partially removed position so that the operator can pull the connector from the selected adapter 84. In so doing, the operator does not need to also hold module 80 to retain module 80 with termination module 30. The force needed to disconnect the connector from the selected adapter 84 is less than the force which holds fiber optic module 80 with termination module 30.

Should the operator desire to remove fiber optic module 80 entirely from termination module 30, the force provided by ball plunger 64 engaging opening 110 can be overcome by the operator grasping the front end 108 of module 80 and pulling outwardly.

In the preferred embodiment, minor side 102 of fiber optic module is further provided with a second opening 120 for holding end 174 of ball 172 when module 80 is fully inserted into termination module 30. Such retention feature is optional since latch 90 retains each fiber optic module 80 with the termination module 30 in the fully inserted position. However, with a retainer arrangement utilizing ball plungers 64, some stress relief may be needed by termination module 30 so as to not bow out panel 152. If desired, second opening can be smaller than first opening 110.

Other retention mechanisms are anticipated for holding and retaining fiber optic modules 80 with termination modules 30 in the partially removed positions. For example, a leaf spring can project inwardly from panel 152 for engagement with structure on fiber optic module 80, including openings in minor side 102, or flange 144.

While the preferred adapters 84, 184 and others noted herein include opposed projections for mounting to apertures 140 in each of major sides 96, 98, other adapters can be used. For example, ST and FC type may be used if an appropriate adapter member is used to link each adapter to module 80 and apertures 140.

It is to be appreciated that the fiber optic module retention features of the present invention can be used with other frames besides frame 10 including termination modules 30. Also, termination modules 30, with the fiber optic module retention mechanism for holding the modules in the partially removed position, can be used with other fiber optic modules besides modules 80. In some applications, it may be desirable to provide modules with plural rows of adapters.

Figure 23:
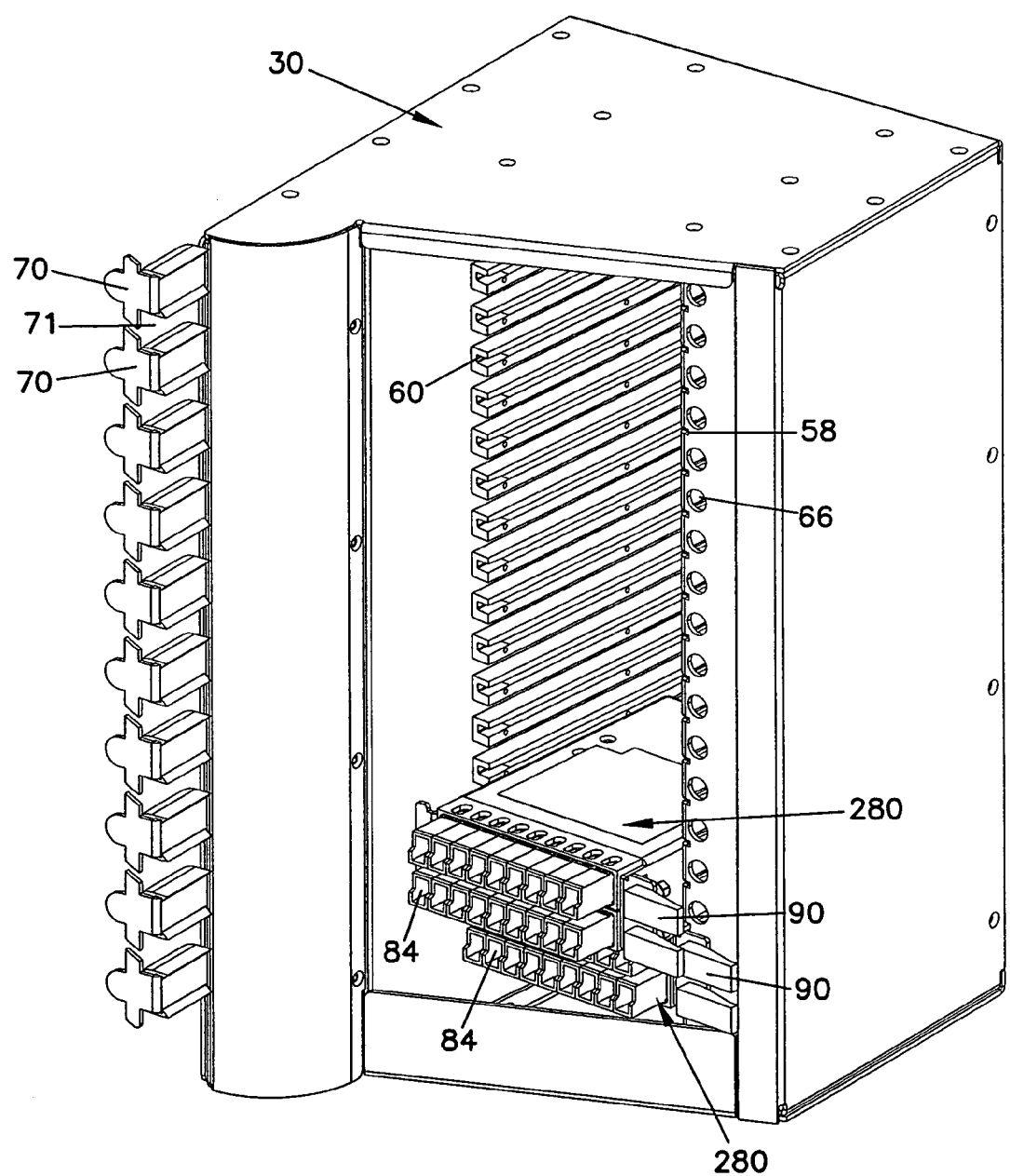
FIG. 23 is a perspective view of the termination module of FIG. 5, showing two fiber optic modules including multiple rows of adapters mounted within the termination module, with one of the modules partially removed.
Figure 24:
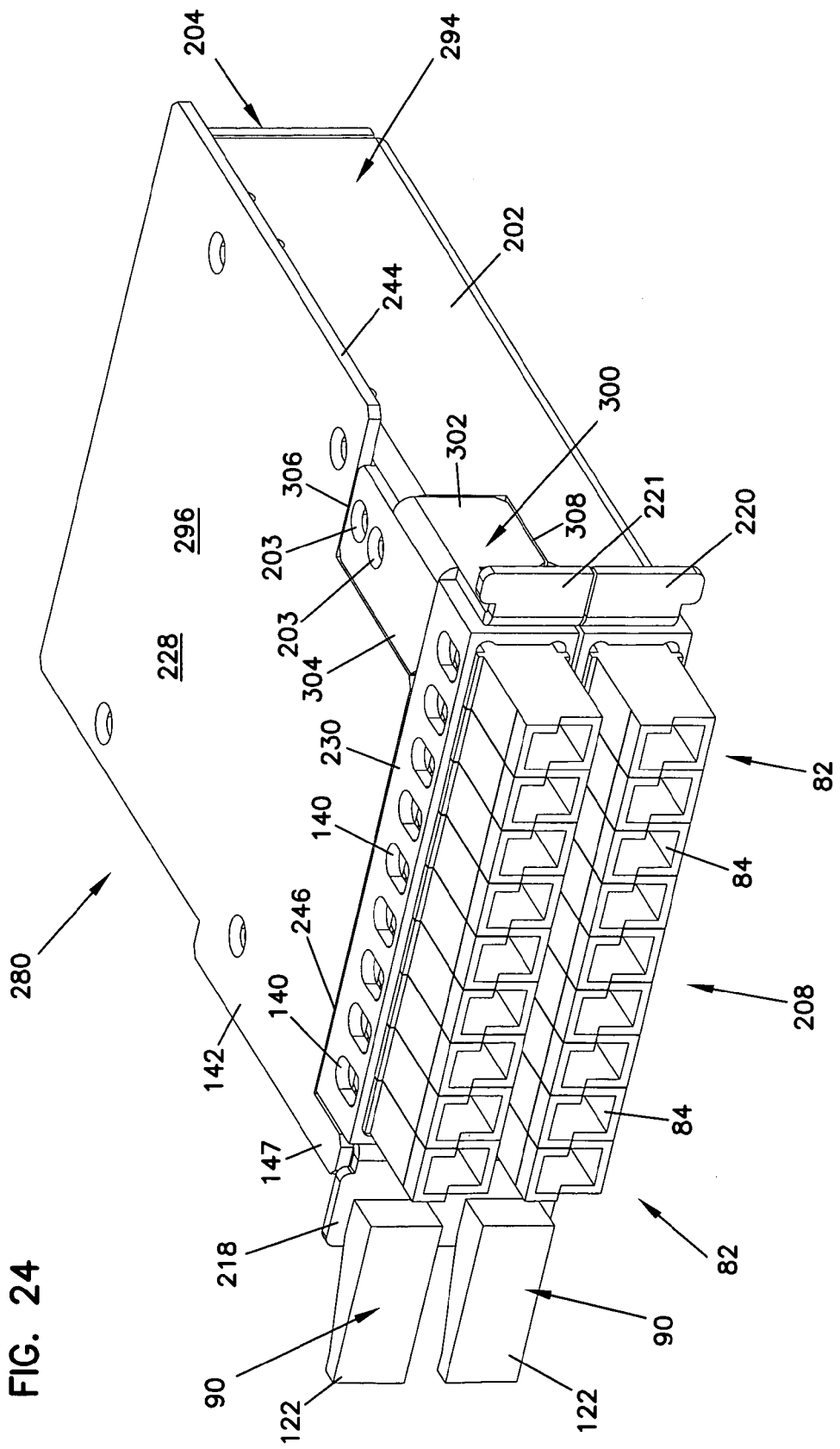
FIG. 24 is a first perspective view of one of the fiber optic modules of FIG. 23.
Figure 27:
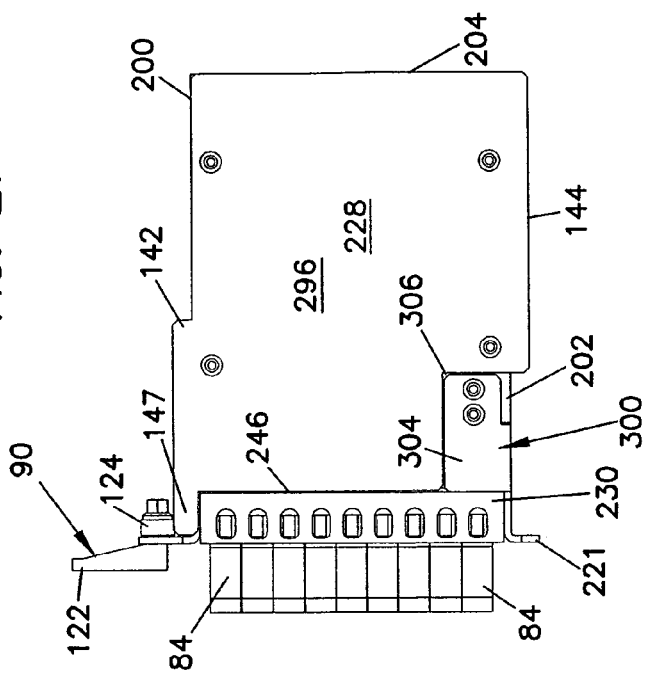
FIG. 27 is a top view of the fiber optic module of FIG. 24.
Figure 26:
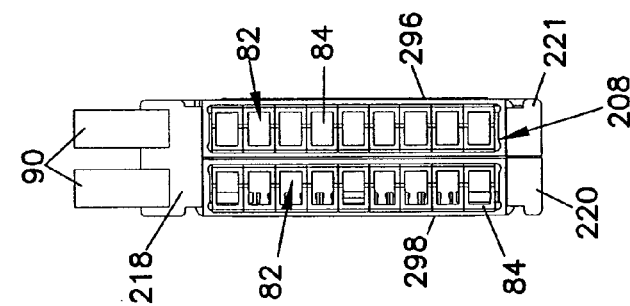
FIG. 26 is a front view of the fiber optic module of FIG. 24.
Figure 28:
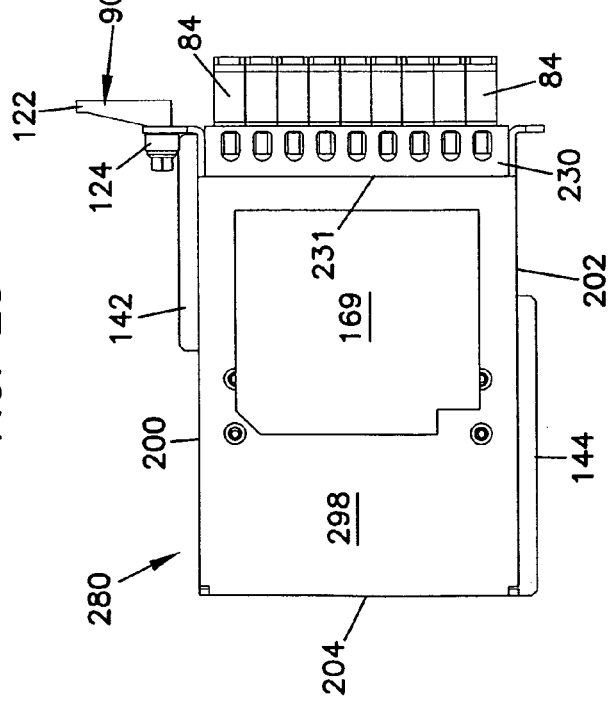
FIG. 28 is a bottom view of the fiber optic module of FIG. 24.

Referring now to FIG. 23, termination module 30 is shown with two fiber optic modules 280 inserted within longitudinal guides 58 and 60. Modules 280 include a plurality of rows of adapters 84 and are releasably held to termination module 30 by latches 90 engaging apertures 66. Whereas modules 80 and 180 occupied a single pair of longitudinal guides 58 and 60, modules 280 occupy two pairs of guides 58 and 60, sliding within and engaging one of the pairs of guides and blocking access to the other pair of guides. Optical components and other items described above as mounted within modules 80 and 180 may also be used within module 280 in a similar manner.

Referring now to FIGS. 24 to 31, module 280 is shown removed from termination module 30. Module 280 includes a housing 294 having first and second major sides 296 and 298. Forming a portion of first major side 296 is a cover 228. First and second minors sides 200 and 202 extend between major sides 296 and 298 and combine with a rear end 204 to define an interior 206 (shown in FIG. 32). Mounted in an open front end 208 of housing 294 are a pair of adapter retainers 230 within which are mounted a plurality of adapters 84 defining connection locations 82. As shown, adapters 84 are E2000 adapters. A front flange 218 extends outward from side 200 and front flanges 220 and 221 extend outward from side 202, all adjacent open front end 208. A pair of swell latches 90 are mounted to front flange 218 and are configured to engage apertures 66 in termination module 30, as described above.

Flange 142 extends outward from side 200 parallel to first major side 296 and a forward portion of flange 142 forms projection 147 adjacent one end of adapter retainer 230. Adapter retainer 230 is positioned within a cutout 246 in cover 228. A second cutout or recess 306 in cover 228 is positioned adjacent side 202 and a side recess 308 is positioned adjacent recess 304. An adapter retainer bracket 300 is mounted within recesses 306 and 308. Bracket 300 includes a top surface 304 within recess 306 parallel to first major surface 296, a side surface 302 within recess 308 parallel to second minor surface 202, and flange 221 extends from side surface 302. Bracket 300 is releasably held within recess 306 by removable fasteners such as screws received within openings 203.

A flange 244 extends outward from side 202 parallel to first major side 296 between recess 306 and rear end 204. Recesses 142 and 244 cooperate to engage longitudinal guides 58 and 60 of termination module 30 to position and mount fiber optic module 280 with termination module 30. Similar to modules 80 and 180, described above, module 280 includes a schematic label 169 mounted to second major surface 298 and openings 110 and 112 in first minor side 200.

Second major side 298 includes a recessed front edge 231 approximately aligned with recess 246 in cover 228. A rear wall of one of the adapter retainers 230 is positioned adjacent each of the recess 246 and recessed edge 231. Each adapter retainer 230 includes a pair of tabs 316 extending outward adjacent minor sides 200 and 202. These tabs 316 (shown in more detail in FIGS. 33 to 36, below) are received within a slot 310 in first minor side 200, a slot 312 in second minor side 202, and a slot 314 in bracket 300. Tabs 316 cooperate with slots 310, 312 and 314 to hold adapter retainers 300 within open front 208, when bracket 300 is held within recesses 306 and 308 in housing 294.

Figure 32:
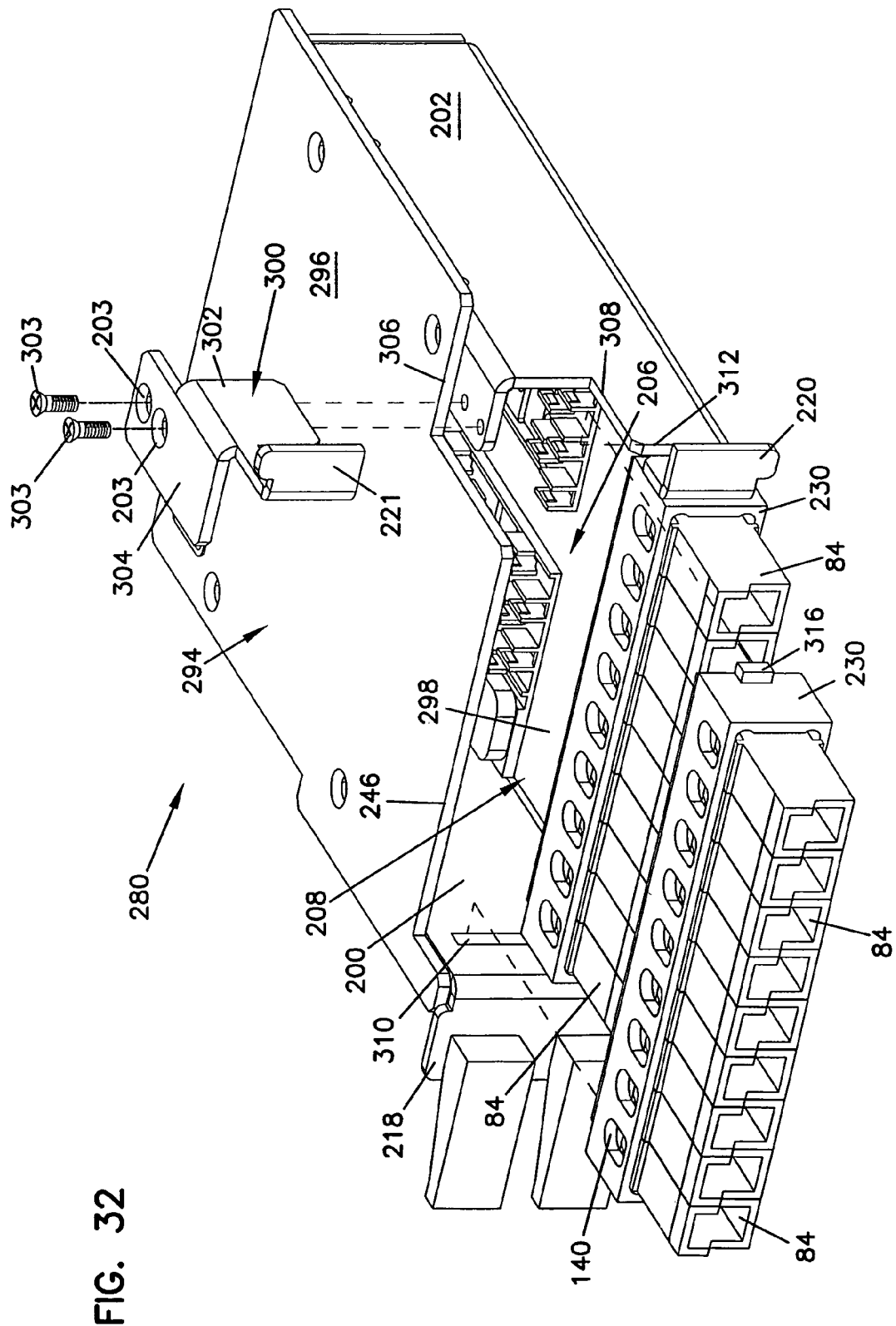
FIG. 32 is a perspective view of the fiber optic module of FIG. 24, with a retainer bracket exploded and one of the adapter retainers removed from the housing.
Figure 38:
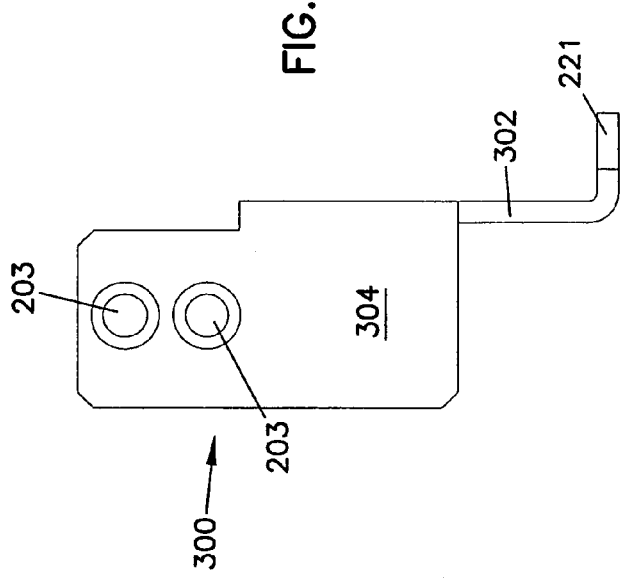
FIG. 38 is a top view of the bracket of FIG. 37.
Figure 40:
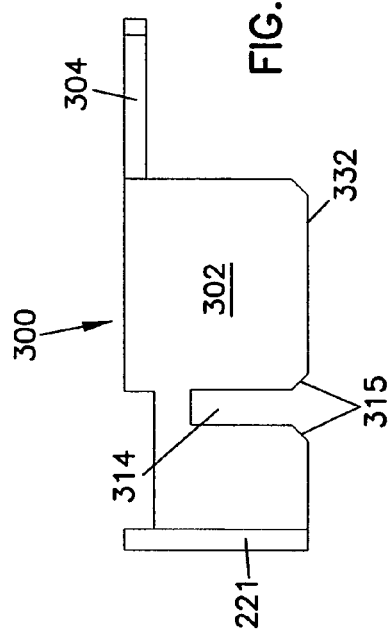
FIG. 40 is a side view of the bracket of FIG. 37.
Figure 37:
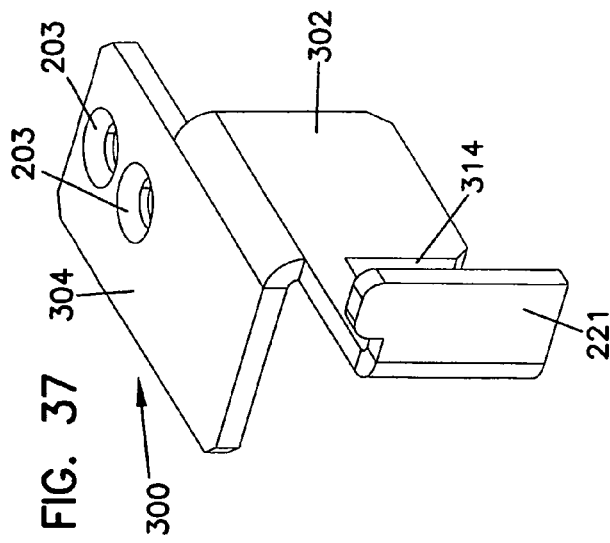
FIG. 37 is a perspective view of the adapter retainer bracket of the fiber optic module of FIG. 24.
Figure 39:
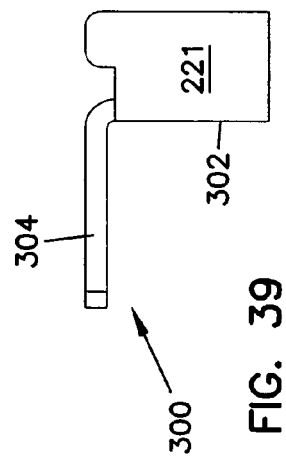
FIG. 39 is a front view of the bracket of FIG. 37.

FIG. 32 illustrates the procedure for removing one or more adapter retainers 230 from open front 208 of module 280. It is desirable to be able to remove one or more of the adapter retainers 230 from module 280 to permit access to or removal of individual adapters 84 adapters mounted within the adapter retainers 230. As shown in more detail below, in FIGS. 33 to 36, adapter retainer 230 includes a plurality of apertures 140, similar in size shape and location to those found in modules 80 and 180, above. These apertures 140 provide openings to be engaged by projections 86 of adapters 84 to releasably hold adapters 84 to one of the adapter retainer 230. As these apertures 140 are located on both the top and bottom of adapter retainers 230, access to both sides of adapter retainers 230 is required to permit removal of adapters 84. The inner rows of apertures 140 of the adapter retainers 230 are not accessible as shown in FIGS. 23 to 31.

To remove an adapter 84 from module 280, module 280 should be removed from termination module 30, as shown in FIG. 32. Screws 303 within fastener holes 203 are removed from bracket 300. Bracket 300 may then be removed from module 280, exposing one of the short sides of the topmost adapter retainer 230 and freeing tab 316 on that side of adapter retainer 230 from slot 314. Adapter retainer 230 may be slide laterally toward recess 308 in side 202 to permit tab 316 on the opposite side of the topmost adapter retainer 230 to be freed from slot 310 in side 200. The topmost adapter retainer 230 is now free to be removed from open front 208 of module 280. This will permit access to apertures 140 on both the top and bottom of adapter retainer 230.

If only two adapter retainers 230 are mounted in module 280, as shown, the bottommost adapter retainer 230 may also be removed to permit access to apertures 140 on both the top and bottom. Alternatively, the bottommost adapter retainer 230 may be left in place in open front 208, as both the top and bottom apertures 140 are accessible in this position. If removal of the bottommost adapter retainer 230 is desired, this adapter retainer would then be slide upward, so that tabs 316 on either side move upward in slots 310 and 312. With bracket 300 removed, tab 316 within slot 312 will eventually become free and permit the bottommost adapter retainer 230 to be slide laterally and removed, similar to the removal of the topmost adapter retainer 230.

Replacement of the adapter retainers 230 within open front 208 would require a general reversal of the above procedure.

Referring now to FIGS. 33 to 36, adapter retainer 230 includes opposing first and second major sides 318 and 320, and opposing first and second minor sides 322 and 324. These major and minor sides cooperate to define an adapter receiving space 326. Apertures 140 are formed in major sides 318 and 320 and are positioned to hold adapters 84 extending through a front end 328 and accessible through a rear end 330 of adapter retainer 230. Rear end 330 will be positioned adjacent recess 246 and 231, of major sides 296 and 298, respectively, when adapter retainer 230 is mounted within open front 208 of module 280. Tabs 316 extend outward from minor sides 322 and 324 adjacent rear end 330. Tabs 316 as shown preferably do not extend from first major side 318 to second major side 320 to aid in removal from slots 310 and 312. It is anticipated that tabs 316 could extend a greater or lesser distance between major sides 318 and 320.

Adapter retainer 230 may be made of a suitably rigid material to prevent deformation of major sides 318 and 320 that might release projections 86 from apertures 140. It is anticipated that aluminum and aluminum alloys may be suitable. Other polymer, composite, or metals having sufficient strength and stiffness may be used. The close spacing of adjacent adapter retainers 230 calls for a more rigid material to avoid inadvertent release of adapters 84, as there is not sufficient room for any stiffening structure or reinforcing elements to be incorporated into major sides 318 and 320. Alternatively, if additional vertical clearance or spacing is provided between rows of adapters 84, major sides 318 and 320 could be configured to include stiffening structural features that would allow other, more flexible materials to be used.

It is anticipated that adapter retainer 230 may be used with a variety of known fiber optic adapters having approximately the same cross-sectional footprint. As shown, adapters 84 held by adapter retainer 230 are E2000 format adapters. These adapters 84 could be interchanged with SC, LX.5, LC or other similar format adapters without requiring modification of adapter retainer 230. It is also anticipated that adapter retainer 230 may be modified to accommodate other formats and styles of adapters, such as FC or ST.

It is anticipated that module 280 with two rows of adapters 84 could be adapted to include three or more rows of adapters 84, with each row held in place by an adapter retainer 230. To secure these multiple rows of adapters 84 in open front 208, bracket 300 would preferably be configured as shown in the FIGS., i.e., with first segment 302 extending downward from first major side 296 along side 202 approximately the height of the topmost adapter retainer 230. Minor sides 200 and 202 would be increased in height to accommodate the height of the one or more added adapter retainers 230. Side 202 would include recess 308 similar to that shown in the FIGS. to accommodate tab 316 of the topmost adapter retainer 230, and slot 312 would extend downward from recess 308 to accommodate tabs 316 of the remaining adapter retainers 230.

Module 280 is shown with a pair of latches 90 in flange 218 for releasably retaining module 280 to termination module 30. Flange 218 extends to cover two apertures 66 of termination module 30, or a number equal to the number of rows of adapters which module 280 may accommodate. It is anticipated that a single latch 90 might be sufficient to hold module 280. Alternatively, if module 280 were adapted to have more than two rows of adapters 84, flange 218 might be increased in height to cover up to the same number of apertures 66 in termination module 30. Accommodations in flanges 218 may be made for one, two, or more latches 90, as may be required or desired for a particular situation.

FIGS. 37 to 40 show bracket 300, which may be used with any of the single or multiple adapter row modules described above. Slot 314 extends upward from a lower edge 332 of first segment 302 and preferably does not extend into second segment 304. As noted above, first segment 302 is preferably approximately the same height between lower edge 332 and second segment 304 as the top most adapter retainer 230 of the module to which bracket 300 is mounted. Other heights of first segment 302 are anticipated as being within the scope of the present disclosure.

A pair of beveled corners 315 may be included in slot 314 adjacent lower edge 332 aid the positioning of tabs 316 of adapter retainers 230 within slot 314. A pair of fastener openings 203 are included in second segment 304 to permit insertion of fasteners to hold bracket 300 to a module, although more or fewer openings and/or fasteners may be used. It is anticipated that bracket 300 may be constructed of aluminum or a similar material, but bracket 300 may also be made of the same material used for cover 228 or other portions of housing 294.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic module adapted to be held by a frame, the fiber optic module comprising:
   a housing including two spaced-apart major sides extending parallel to one another, the major sides interconnected by two spaced-apart minor sides extending parallel to one another, the major and minor sides extending between front and rear ends of the housing, the front end being open and defined by the two major and minor sides;
   at least one adapter retainer removably mounted within the front end extending between the minor sides, the adapter retainer having first and second major sides extending generally parallel to the major sides of the housing, the major sides of the adapter retainer including a plurality of apertures;
   front flanges on opposite ends of the front end, one of the front flanges including a latch for latching the front end of the housing to the frame;
   two side flanges extending in opposite directions from one of the major sides; and
   a bracket removably mounted to one of the major sides of the housing and positioned to prevent removal of the at least one adapter retainer from the housing.

2. The fiber optic module of claim 1, further comprising:
   a plurality of fiber optic adapters mounted to the front end, each adapter including two projections, each projection received in one of the apertures in each of the major sides of one of the adapter retainers;
   a fiber optic coupler mounted within the housing;
   cables connecting the fiber optic adapters and the fiber optic coupler.

3. The fiber optic module of claim 1, wherein two adapter retainers are mounted within the front end of the housing, and each adapter retainer defines a row of positions to receive fiber optic connectors.

4. The fiber optic module of claim 1, wherein each of the adapter retainers includes a pair of minor sides extending between the major sides of the adapter retainer, and each of the minor sides includes an outward extending tab, the minor sides of the housing each include a slot for receiving one of the tabs of the adapter retainer, and the bracket is positioned in one of the major sides of the housing and above the slot in one of the minor sides of the housing.

5. The fiber optic module of claim 4, wherein the bracket includes a first segment extending generally coplanar to and within a cutout in one of the minor sides of the housing, and a second segment extending generally coplanar to and within a cutout of one of the major surfaces of the housing, the first segment of the bracket including a slot which cooperates with the slot of the minor side to receive tabs extending from one of the minor sides of the adapter retainer.

6. The fiber optic module of claim 5, wherein the first segment of the bracket extends downward from one of the major sides of the housing along one of the minor sides of the housing a distance generally the same as a height defined by one of the minor sides of the adapter retainer.

7. The fiber optic adapter of claim 5, wherein the bracket further includes a flange extending outward from the first segment and forming a portion of one of the front flanges of the housing.

* * * * *